(12) United States Patent
Xue et al.

(10) Patent No.: US 10,756,865 B2
(45) Date of Patent: Aug. 25, 2020

(54) PILOT SEQUENCE SENDING METHOD AND APPARATUS

(71) Applicant: HUAWEI TECHNOLOGIES CO., LTD., Shenzhen, Guangdong (CN)

(72) Inventors: Xin Xue, Shenzhen (CN); Ju Cao, Shenzhen (CN); Le Liu, Shenzhen (CN); Ningjuan Wang, Shenzhen (CN); Wei Lin, Shenzhen (CN)

(73) Assignee: HUAWEI TECHNOLOGIES CO., LTD., Shenzhen, Guangdong (CN)

( * ) Notice: Subject to any disclaimer, the term of this patent is extended or adjusted under 35 U.S.C. 154(b) by 74 days.

(21) Appl. No.: 16/115,296

(22) Filed: Aug. 28, 2018

(65) Prior Publication Data

US 2018/0367276 A1 Dec. 20, 2018

Related U.S. Application Data

(63) Continuation of application No. PCT/CN2017/074256, filed on Feb. 21, 2017.

(30) Foreign Application Priority Data

Feb. 29, 2016 (CN) .......................... 2016 1 00116067

(51) Int. Cl.
*H04L 5/00* (2006.01)
*H04L 27/26* (2006.01)
(Continued)

(52) U.S. Cl.
CPC ......... *H04L 5/0048* (2013.01); *H04B 7/0452* (2013.01); *H04L 25/03866* (2013.01);
(Continued)

(58) Field of Classification Search
CPC .................. H04L 25/03866; H04L 27/261
See application file for complete search history.

(56) References Cited

U.S. PATENT DOCUMENTS 4,843,587 A 6/1989 Schlunt et al.
5,483,475 A 1/1996 Kao
(Continued)

FOREIGN PATENT DOCUMENTS

CN 102783065 A 11/2012
CN 102934405 A 2/2013
(Continued)

OTHER PUBLICATIONS

Shahrnaz Azizi et al, OFDMA Numerology and Structure. IEEE 802.11-15/0330r5, May 2015, 50 pages.

*Primary Examiner* — Redentor Pasia
(74) *Attorney, Agent, or Firm* — Womble Bond Dickinson (US) LLP

(57) ABSTRACT

A pilot sequence sending method and apparatus are provided. In the disclosure, after first-time masking is performed on a pilot sequence based on a cyclic orthogonal matrix, second-time masking is performed on the pilot sequence on which first-time masking has been performed, so that a PAPR of the pilot sequence on which second-time masking has been performed is less than a PAPR of the pilot sequence on which first-time masking has been performed, and further, orthogonality of the pilot sequence on which second-time masking has been performed can be higher than that of the pilot sequence on which first-time masking has been performed. This ensures accuracy of channel estimation and frequency offset detection.

20 Claims, 8 Drawing Sheets

(51) Int. Cl.
*H04L 25/03* (2006.01)
*H04B 7/0452* (2017.01)

(52) U.S. Cl.
CPC .......... *H04L 27/261* (2013.01); *H04L 27/262* (2013.01); *H04L 27/2613* (2013.01); *H04L 27/2614* (2013.01)

(56) References Cited

U.S. PATENT DOCUMENTS

| | | |
|---|---|---|
| 5,933,537 A | 8/1999 | Hajjahmad et al. |
| 9,065,482 B1 | 6/2015 | Johnston et al. |
| 9,686,757 B1* | 6/2017 | Lee ................ H04W 52/36 |
| 2011/0299382 A1 | 12/2011 | Van Nee et al. |
| 2013/0070580 A1 | 3/2013 | Wang et al. |
| 2013/0107893 A1 | 5/2013 | Zhang |
| 2013/0322563 A1* | 12/2013 | Van Zelst ........... H04L 27/2621 375/295 |
| 2015/0131756 A1 | 5/2015 | Suh et al. |
| 2015/0156038 A1 | 6/2015 | Van Nee et al. |
| 2017/0034829 A1* | 2/2017 | Yang ................ H04W 72/0486 |
| 2017/0041825 A1* | 2/2017 | Yang ................ H04W 28/065 |
| 2017/0105215 A1* | 4/2017 | Li ..................... H04B 7/0413 |

FOREIGN PATENT DOCUMENTS

| | | |
|---|---|---|
| CN | 103999392 A | 8/2014 |
| CN | 105264991 A | 1/2016 |

\* cited by examiner

| Max PAPR(dB) | RU | Min PAPR (Data part) | No mask (worst case) | P-matrix+block mask (worst case) | P-matrix (worst case) |
|---|---|---|---|---|---|
| 2x 20MHz | 106 | 6.0 (0.0) | 4.89 (-1.11) | 6.14 (+1.14) | 7.35 (+0.85) |
|  | 242 | 6.8 (0.0) | 5.31 (-1.49) | 6.55 (-0.25) | 8.34 (+1.14) |
| 2x 40MHz | 106 | 6.0 (0.0) | 5.42 (-0.58) | 5.89 (-0.11) | 7.92 (+1.42) |
|  | 242 | 6.8 (0.0) | 5.32 (-1.48) | 5.98 (-0.82) | 7.60 (+0.04) |
|  | 484 | 7.2 (0.0) | 6.00 (-1.20) | 6.34 (-0.86) | 9.52 (+1.77) |
| 2x 80MHz | 106 | 6.0 (0.0) | 5.42 (-0.58) | 5.90 (-0.10) | 8.98 (+2.48) |
|  | 242 | 6.8 (0.0) | 5.29 (-1.51) | 6.54 (-0.26) | 7.82 (+0.62) |
|  | 484 | 7.2 (0.0) | 6.27 (-0.93) | 6.95 (-0.25) | 8.71 (+0.96) |
|  | 996 | 7.8 (0.0) | 6.01 (-1.79) | 7.15 (-0.65) | 9.08 (+0.85) |

FIG. 4

| Max PAPR(dB) | RU | Min PAPR (Data part) | No mask (worst case) | Chu-matrix (worst case) | P-matrix (worst case) |
|---|---|---|---|---|---|
| 2x 20MHz | 106 | 6.0 (0.0) | 4.89 (-1.11) | 5.96 (-0.04) | 7.55 (+1.55) |
|  | 242 | 6.8 (0.0) | 5.31 (-1.49) | 6.07 (-0.73) | 7.66 (+0.86) |
| 2x 40MHz | 106 | 6.0 (0.0) | 5.42 (-0.58) | 5.84 (-0.16) | 7.92 (+1.92) |
|  | 242 | 6.8 (0.0) | 5.32 (-1.48) | 6.38 (-0.42) | 7.60 (+0.80) |
|  | 484 | 7.2 (0.0) | 6.00 (-1.20) | 6.42 (-0.78) | 8.57 (+1.37) |
| 2x 80MHz | 106 | 6.0 (0.0) | 5.42 (-0.58) | 5.98 (-0.02) | 8.98 (+2.98) |
|  | 242 | 6.8 (0.0) | 5.29 (-1.51) | 6.55 (-0.25) | 7.79 (+0.99) |
|  | 484 | 7.2 (0.0) | 6.27 (-0.93) | 6.66 (-0.54) | 9.51 (+2.31) |
|  | 996 | 7.8 (0.0) | 6.01 (-1.79) | 6.73 (-1.07) | 9.30 (+1.50) |

FIG. 5

| Max PAPR(dB) | RU | Min PAPR (Data part) | No mask (worst case) | P-matrix+block mask (worst case) | P-matrix (worst case) |
|---|---|---|---|---|---|
| 4x 20MHz | 106 | 6.0 (0.0) | 4.90 (-1.10) | 6.21 (+0.21) | 7.89 (+1.89) |
|  | 242 | 6.8 (0.0) | 5.26 (-1.54) | 6.77 (-0.03) | 9.25 (+2.45) |
| 4x 40MHz | 106 | 6.0 (0.0) | 5.37 (-0.63) | 6.40 (+0.40) | 7.75 (+1.75) |
|  | 242 | 6.8 (0.0) | 5.41 (-1.39) | 7.09 (+0.29) | 10.11 (+3.31) |
|  | 484 | 7.2 (0.0) | 5.77 (-1.43) | 7.26 (+0.06) | 8.81 (+1.61) |
| 4x 80MHz | 106 | 6.0 (0.0) | 5.53 (-0.47) | 6.47 (+0.47) | 7.54 (+1.54) |
|  | 242 | 6.8 (0.0) | 5.60 (-1.20) | 7.18 (+0.38) | 9.82 (+3.02) |
|  | 484 | 7.2 (0.0) | 5.96 (-1.24) | 7.61 (+0.41) | 9.14 (+1.94) |
|  | 996 | 7.8 (0.0) | 6.18 (-1.62) | 8.38 (+0.58) | 9.23 (+1.43) |

FIG. 6

| Max PAPR(dB) | RU | Min PAPR (Data part) | No mask (worst case) | P-matrix+block mask (worst case) | P-matrix (worst case) |
|---|---|---|---|---|---|
| 4x 20MHz | 106 | 6.0 (0.0) | 4.90 (-1.10) | 5.97 (-0.03) | 7.89 (+1.89) |
|  | 242 | 6.8 (0.0) | 5.26 (-1.54) | 6.31 (-0.49) | 9.25 (+2.45) |
| 4x 40MHz | 106 | 6.0 (0.0) | 5.37 (-0.63) | 6.00 (-0.00) | 7.75 (+1.75) |
|  | 242 | 6.8 (0.0) | 5.41 (-1.39) | 6.73 (-0.07) | 10.11 (+3.31) |
|  | 484 | 7.2 (0.0) | 5.77 (-1.43) | 7.11 (-0.09) | 8.81 (+1.61) |
| 4x 80MHz | 106 | 6.0 (0.0) | 5.53 (-0.47) | 6.10 (+0.10) | 7.54 (+1.54) |
|  | 242 | 6.8 (0.0) | 5.60 (-1.20) | 6.76 (-0.04) | 9.82 (+3.02) |
|  | 484 | 7.2 (0.0) | 5.96 (-1.24) | 7.19 (-0.01) | 9.14 (+1.94) |
|  | 996 | 7.8 (0.0) | 6.18 (-1.62) | 7.74 (-0.06) | 9.23 (+1.43) |

FIG. 7

| Max PAPR(dB) | RU | Min PAPR (Data part) | No mask (worst case) | Chu-matrix (worst case) | P-matrix (worst case) |
|---|---|---|---|---|---|
| 4×20MHz | 106 | 6.0 (0.0) | 4.90 (-1.10) | 5.44 (-0.56) | 7.89 (+1.89) |
|  | 242 | 6.8 (0.0) | 5.26 (-1.54) | 5.72 (-1.08) | 7.53 (+0.73) |
| 4×40MHz | 106 | 6.0 (0.0) | 5.37 (-0.63) | 5.96 (-0.04) | 7.75 (+1.75) |
|  | 242 | 6.8 (0.0) | 5.41 (-1.39) | 6.09 (-0.71) | 10.11 (+3.31) |
|  | 484 | 7.2 (0.0) | 5.77 (-1.43) | 6.41 (-0.79) | 8.06 (+0.86) |
| 4×80MHz | 106 | 6.0 (0.0) | 5.53 (-0.47) | 5.99 (-0.01) | 7.54 (+1.54) |
|  | 242 | 6.8 (0.0) | 5.60 (-1.20) | 6.19 (-0.61) | 9.82 (+3.02) |
|  | 484 | 7.2 (0.0) | 5.96 (-1.24) | 6.96 (-0.24) | 9.14 (+1.94) |
|  | 996 | 7.8 (0.0) | 6.18 (-1.62) | 7.17 (-0.63) | 8.22 (+0.42) |

PILOT SEQUENCE SENDING METHOD AND APPARATUS

CROSS-REFERENCE TO RELATED APPLICATIONS

This application is a continuation of International Application No. PCT/CN2017/074256, filed on Feb. 21, 2017, which claims priority to Chinese Patent Application No. 201610116067.0, filed on Feb. 29, 2016. The disclosures of the aforementioned applications are hereby incorporated by reference in their entireties.

TECHNICAL FIELD

The disclosure relates to the wireless communications field, and in particular, to a pilot sequence sending method and apparatus.

BACKGROUND

A next generation wireless local area network (WLAN) standard 802.11ax is dedicated to further improving WLAN spectral efficiency, an area throughput, actual user experience, and performance in various environments of indoor and outdoor dense network deployment, and requires suppression of interference between devices, so as to meet large-scale and highly-loaded networking requirements.

Specific to an uplink multi-user (UL-MU) sending mode, the industry provides a solution of performing, by using a P-matrix, masking on a high efficiency long training field (HE-LTF), to improve HE-LTF orthogonality. An HE-LTF is a pilot sequence, and a receive end performs channel estimation and frequency offset detection based on a received HE-LTF. The P-matrix includes eight rows of sequences that are corresponding to eight encoded data sequence flows, respectively. A station (STA) performs, by using a corresponding row sequence in the P-matrix and based on a data-flow transport layer allocated by an access point (AP), masking on an HE-LTF that needs to be sent by the STA.

After masking is performed on the HE-LTF by using the P-matrix, a peak-to-average power ratio (PAPR) of the HE-LTF is usually relatively high, and even far greater than a minimum PAPR threshold of a data portion. This affects accuracy of channel estimation and frequency offset detection.

SUMMARY

Embodiments of the disclosure provide a pilot sequence sending method and apparatus, so as to reduce a PAPR of a pilot sequence.

A pilot sequence sending method provided by an embodiment of the disclosure includes:

obtaining a pilot sequence based on at least an allocated resource unit (RU);

performing first-time masking on the pilot sequence based on a cyclic orthogonal matrix;

performing second-time masking on the pilot sequence on which first-time masking has been performed, where a peak-to-average power ratio (PAPR) of the pilot sequence on which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed; and sending the pilot sequence on which second-time masking has been performed.

Optionally, the performing second-time masking on the pilot sequence on which first-time masking has been performed includes:

performing, based on a masking manner corresponding to each of M blocks, masking on a subsequence corresponding to each block in the pilot sequence on which first-time masking has been performed, to obtain the pilot sequence on which second-time masking has been performed, where one block is corresponding to one subsequence of a length N in the pilot sequence, M×N is greater than or equal to a length of the pilot sequence on which first-time masking has been performed, and both M and N are integers greater than 1.

Before the performing, based on a masking manner corresponding to each of M blocks, masking on a subsequence corresponding to each block in the pilot sequence on which first-time masking has been performed, the method further includes:

obtaining a preset block mask template based on at least the allocated RU, where the block mask template includes indication information of the masking manner corresponding to each of the M blocks.

The obtaining a preset block mask template based on at least the allocated RU includes:

obtaining the preset block mask template based on a size and a location of the allocated RU; or obtaining the preset block mask template based on a size and a location of the allocated RU and an uplink multi-user multiple-input multiple-output (MU-MIMO) sending mode; or obtaining the preset block mask template based on a system bandwidth, a size and a location of the allocated RU, and an uplink MU-MIMO sending mode.

Optionally, a masking manner corresponding to a block is keeping polarity unchanged or making polarity reversed.

Optionally, the obtaining a pilot sequence includes:

obtaining the pilot sequence based on the size and the location of the allocated RU; or obtaining the pilot sequence based on the size and the location of the allocated resource unit RU and the uplink MU-MIMO sending mode; or obtaining the pilot sequence based on the system bandwidth, the size and the location of the allocated RU, and the uplink MU-MIMO sending mode.

Optionally, before the sending the pilot sequence on which second-time masking has been performed, the method further includes:

multiplying an allocated identification code by the pilot sequence on which second-time masking has been performed, where the identification code is used to identify a terminal scheduled based on uplink MU-MIMO.

A pilot sequence sending method provided by another embodiment of the disclosure includes:

obtaining a pilot sequence based on at least an allocated resource unit (RU), where the pilot sequence is obtained by performing first-time masking based on a cyclic orthogonal matrix and then performing second-time masking, a peak-to-average power ratio (PAPR) of the pilot sequence on which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed; and sending the obtained pilot sequence.

Optionally, the pilot sequence is pre-generated, and a process of generating the pilot sequence includes:

performing, based on the cyclic orthogonal matrix, first-time masking on the pilot sequence corresponding to the UR; and performing, based on a masking manner corresponding to each of M blocks, masking on a subsequence corresponding to each block in the pilot sequence on which first-time masking has been performed, to obtain the pilot sequence on which second-time masking has been performed, where one block is corresponding to one subsequence of a length N in the pilot sequence, M×N is greater than or equal to a length of the pilot sequence on which first-time masking has been performed, and both M and N are integers greater than 1.

Before the performing, based on a masking manner corresponding to each of M blocks, masking on a subsequence corresponding to each block in the pilot sequence on which first-time masking has been performed, the method further includes:

obtaining a preset block mask template, where the block mask template includes indication information of the masking manner corresponding to each of the M blocks.

Optionally, a masking manner corresponding to a block is keeping polarity unchanged or making polarity reversed.

Optionally, the obtaining a pilot sequence based on at least a size and a location of an allocated resource unit (RU) includes:

obtaining the pilot sequence based on the size and the location of the allocated resource unit RU; or obtaining the pilot sequence based on the size and the location of the allocated resource unit RU, and an uplink multi-user multiple-input multiple-output (MU-MIMO) sending mode; or obtaining the pilot sequence based on a system bandwidth, the size and the location of the allocated resource unit RU, and an uplink MU-MIMO sending mode.

Optionally, before the sending the obtained pilot sequence, the method further includes:

multiplying an allocated identification code by the obtained pilot sequence, where the identification code is used to identify a terminal scheduled based on uplink MU-MIMO.

A pilot sequence sending apparatus provided by an embodiment of the disclosure includes:

an obtaining module, configured to obtain a pilot sequence;

a first masking module, configured to perform, based on a cyclic orthogonal matrix, first-time masking on the pilot sequence obtained by the obtaining module;

a second masking module, configured to perform second-time masking on the pilot sequence on which first-time masking by the first masking module is performed, where a peak-to-average power ratio (PAPR) of the pilot sequence on which second-time masking has been performed is less than a PAPR of the pilot sequence on which first-time masking has been performed; and a sending module, configured to send the pilot sequence on which second-time masking by the second masking module is performed.

Optionally, the second masking module is specifically configured to:

perform, based on a masking manner corresponding to each of M blocks, masking on a subsequence corresponding to each block in the pilot sequence on which first-time masking has been performed, to obtain the pilot sequence on which second-time masking has been performed, where one block is corresponding to one subsequence of a length N in the pilot sequence, M×N is greater than or equal to a length of the pilot sequence on which first-time masking has been performed, and both M and N are integers greater than 1.

The second masking module is further configured to:

before performing, based on the masking manner corresponding to each of M blocks, masking on the subsequence corresponding to each block in the pilot sequence on which first-time masking has been performed, obtain a preset block mask template based on at least an allocated RU, where the block mask template includes indication information of the masking manner corresponding to each of the M blocks.

The second masking module is specifically configured to:

obtain the preset block mask template based on a size and a location of the allocated RU; or obtain the preset block mask template based on a size and a location of the allocated RU and an uplink multi-user multiple-input multiple-output (MU-MIMO) sending mode; or obtain the preset block mask template based on a system bandwidth, a size and a location of the allocated RU, and an uplink MU-MIMO sending mode.

Optionally, a masking manner corresponding to a block is keeping polarity unchanged or making polarity reversed.

Optionally, the obtaining module is specifically configured to:

obtain the pilot sequence based on the size and the location of the allocated RU; or obtain the pilot sequence based on the size and the location of the allocated resource unit (RU) and the uplink MU-MIMO sending mode; or obtain the pilot sequence based on the system bandwidth, the size and the location of the allocated RU, and the uplink MU-MIMO sending mode.

Optionally, the apparatus further includes:

a processing module, configured to: before the pilot sequence on which second-time masking has been performed is sent, multiply an allocated identification code by the pilot sequence on which second-time masking has been performed, where the identification code is used to identify a terminal scheduled based on uplink MU-MIMO.

Another pilot sequence sending apparatus provided by an embodiment of the disclosure includes:

an obtaining module, configured to obtain a pilot sequence based on at least an allocated resource unit (RU), where the pilot sequence is obtained by performing first-time masking based on a cyclic orthogonal matrix and then performing second-time masking, a peak-to-average power ratio (PAPR) of the pilot sequence on which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed; and a sending module, configured to send the obtained pilot sequence.

Optionally, the pilot sequence is pre-generated, and a process of generating the pilot sequence includes:

performing, based on the cyclic orthogonal matrix, first-time masking on the pilot sequence corresponding to the UR; and performing, based on a masking manner corresponding to each of M blocks, masking on a subsequence corresponding to each block in the pilot sequence on which first-time masking has been performed, to obtain the pilot sequence on which second-time masking has been performed, where one block is corresponding to one subsequence of a length N in the pilot sequence, M×N is greater than or equal to a length of the pilot sequence on which first-time masking has been performed, and both M and N are integers greater than 1.

Before performing, based on a masking manner corresponding to each of M blocks, masking on a subsequence corresponding to each block in the pilot sequence on which first-time masking has been performed, the apparatus is further configured to:

obtain a preset block mask template, where the block mask template includes indication information of the masking manner corresponding to each of the M blocks.

A masking manner corresponding to a block is keeping polarity unchanged or making polarity reversed.

Optionally, the obtaining a pilot sequence based on at least a size and a location of an allocated resource unit (RU) includes:

obtaining the pilot sequence based on the size and the location of the allocated resource unit (RU); or obtaining the pilot sequence based on the size and the location of the allocated resource unit (RU), and an uplink multi-user multiple-input multiple-output (MU-MIMO) sending mode; or obtaining the pilot sequence based on a system bandwidth, the size and the location of the allocated resource unit (RU), and an uplink MU-MIMO sending mode.

Optionally, the apparatus further includes:

a processing module, configured to: before the sending module sends the obtained pilot sequence, multiply an allocated identification code by the obtained pilot sequence, where the identification code is used to identify a terminal scheduled based on uplink MU-MIMO.

An access point provided by an embodiment of the disclosure includes a memory and a processing unit, where the memory is configured to provide an instruction and data to the processing unit; and the processing unit is configured to perform the following procedure based on the instruction and the data provided by the memory:

obtain a pilot sequence based on at least an allocated resource unit RU;

perform first-time masking on the pilot sequence based on a cyclic orthogonal matrix;

perform second-time masking on the pilot sequence on which first-time masking has been performed, where a peak-to-average power ratio (PAPR) of the pilot sequence on which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed; and send the pilot sequence on which second-time masking has been performed.

An access point provided by another embodiment of the disclosure includes a memory and a processing unit, where the memory is configured to provide an instruction and data to the processing unit; and the processing unit is configured to perform the following procedure based on the instruction and the data provided by the memory:

obtain a pilot sequence based on at least an allocated resource unit (RU), where the pilot sequence is obtained by performing first-time masking based on a cyclic orthogonal matrix and then performing second-time masking, a PAPR of the pilot sequence on which second-time masking has been performed is less than a peak-to-average power ratio (PAPR) of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed; and send the obtained pilot sequence.

In the foregoing embodiments of the disclosure, after first-time masking is performed on the pilot sequence based on the cyclic orthogonal matrix, second-time masking is performed on the pilot sequence on which first-time masking has been performed, so that a PAPR of the pilot sequence on which second-time masking has been performed is less than a PAPR of the pilot sequence on which first-time masking has been performed, and further, orthogonality of the pilot sequence on which second-time masking has been performed can be higher than that of the pilot sequence on which first-time masking has been performed. This ensures accuracy of channel estimation and frequency offset detection.

BRIEF DESCRIPTION OF DRAWINGS

FIG. 4 shows a table of comparison between a PAPR value of a 2×HE-LTF sequence on which first-time masking has been performed based on a P-matrix and a PAPR value of the 2×HE-LTF sequence on which second-time masking has been performed based on a block length L=4 according to an embodiment of the disclosure;

FIG. 5 shows a table of comparison between a PAPR value of a 2×HE-LTF sequence on which first-time masking has been performed based on a Chu-matrix and a PAPR value of the 2×HE-LTF sequence on which second-time masking has been performed based on a block length L=8 according to an embodiment of the disclosure;

FIG. 6 shows a table of comparison between a PAPR value of a 4×HE-LTF sequence on which first-time masking has been performed based on a P-matrix and a PAPR value of the 4×HE-LTF sequence on which second-time masking has been performed based on a block length L=4 according to an embodiment of the disclosure;

FIG. 7 shows a table of comparison between a PAPR value of a 4×HE-LTF sequence on which first-time masking has been performed based on a P-matrix and a PAPR value of the 4×HE-LTF sequence on which second-time masking has been performed based on a block length L=8 according to an embodiment of the disclosure;

DESCRIPTION OF EMBODIMENTS

In embodiments of the disclosure, after first-time masking is performed on a pilot sequence based on a cyclic orthogonal matrix, second-time masking is performed, based on a preset masking manner, on the pilot sequence on which first-time masking has been performed, so that a PAPR of the pilot sequence on which second-time masking has been performed is less than a PAPR of the pilot sequence on which first-time masking has been performed, and further, higher orthogonality can be obtained.

The embodiments of the disclosure may be applicable to an uplink multiple-input multiple-output (MIMO) transmission process, and in particular, to an uplink multi-user MIMO (MU-MIMO) transmission process. In the uplink MU-MIMO transmission process, different users use same time-frequency resources for uplink sending (single-antenna sending). From a perspective of a receive end, it may be considered that data flows are from different antennas of one device, so that a virtual MIMO system is formed.

The embodiments of the disclosure may be applicable to an 802.11ax system. For example, the embodiments of the disclosure are applied to the 802.11ax system. For better understanding of the embodiments of the disclosure, the following first describes some technologies and relevant technical terms used in the embodiments of the disclosure.

Figure 1A:
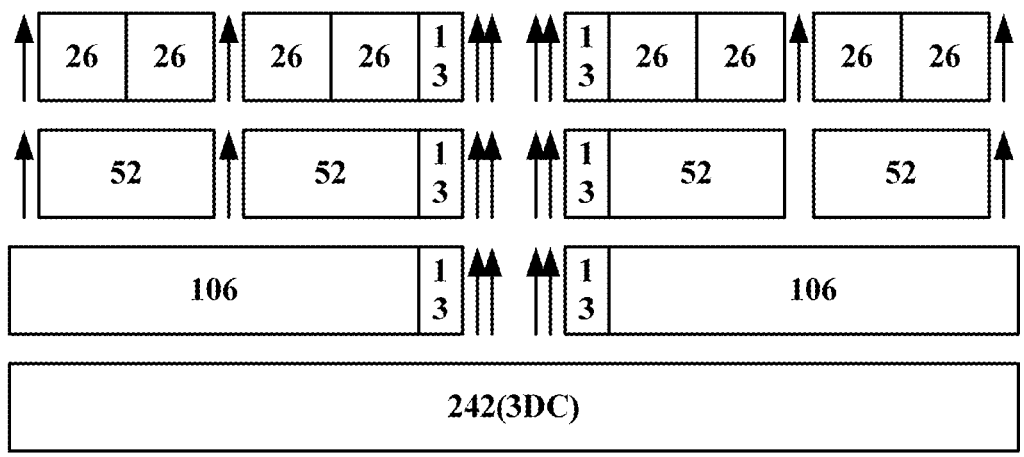
FIG. 1a is a schematic diagram of distribution of OFDMA RUs at a system bandwidth of 20 MHz in an existing 802.11ax system.
Figure 1B:
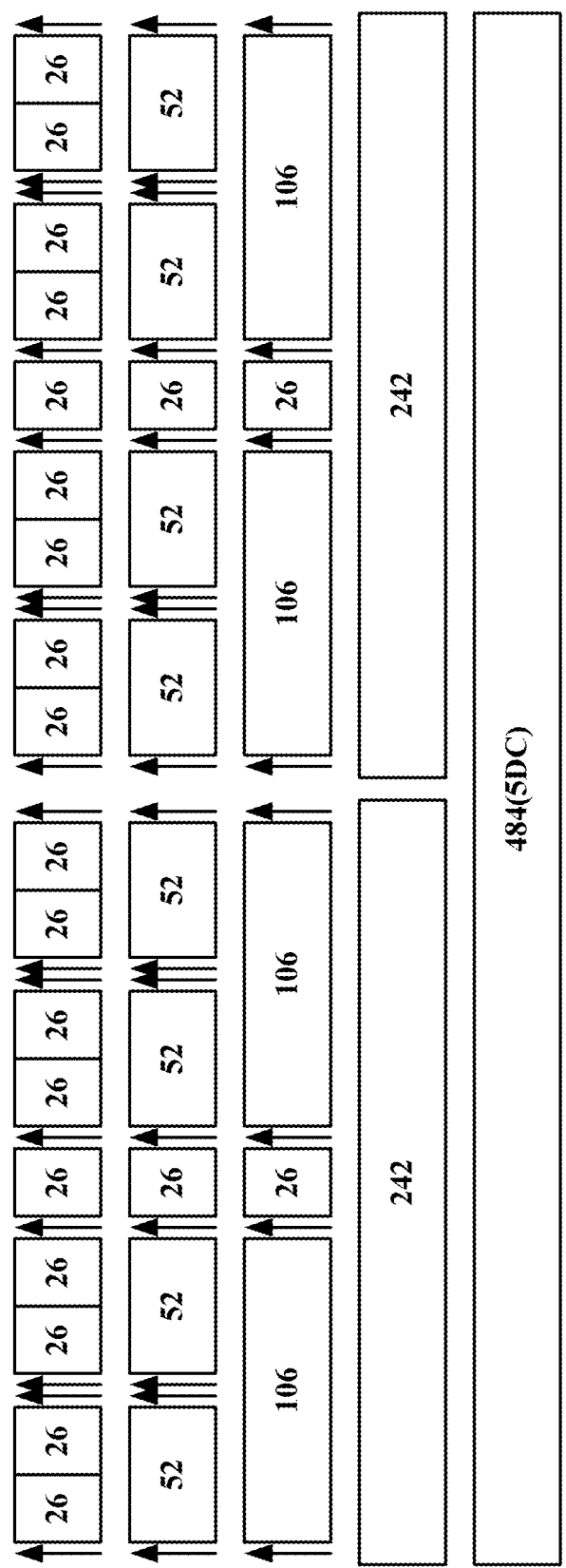
FIG. 1b is a schematic diagram of distribution of OFDMA RUs at a system bandwidth of 40 MHz in an existing 802.11ax system.
Figure 1C:
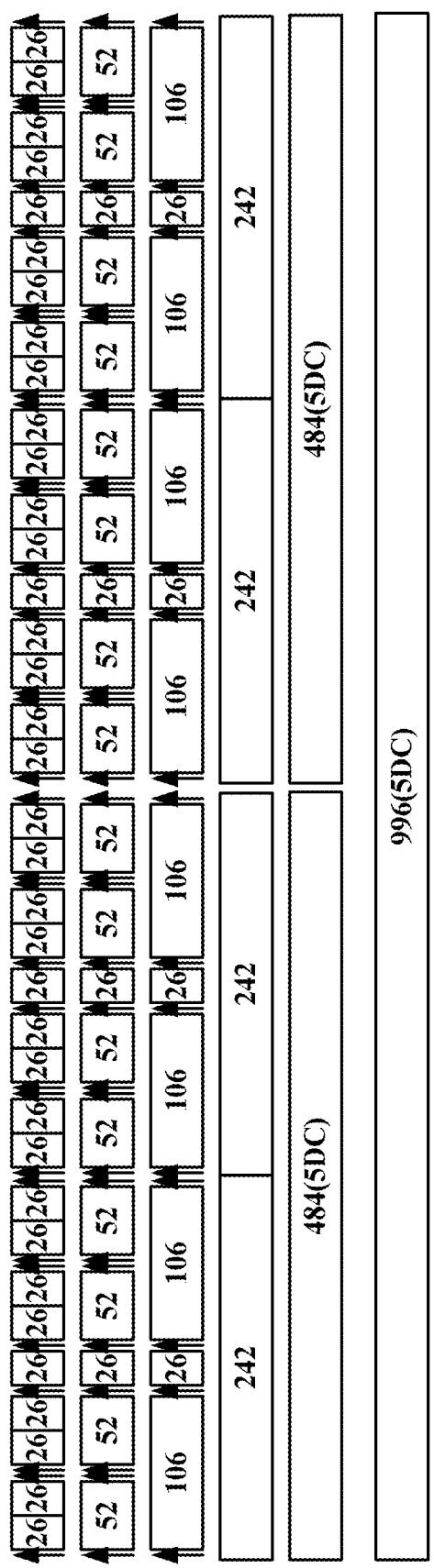
FIG. 1c is a schematic diagram of distribution of OFDMA RUs at a system bandwidth of 80 MHz in an existing 802.11ax system.

(1) Tone Plan (Distribution of Subcarriers that Carry Data) in the 802.11ax System In the 802.11ax system, to support indoor and outdoor scenarios, a symbol length (4×3.2 μs=12.8 μs) that is four times a symbol length in an 802.11ac system is used, and a subcarrier spacing is 312.5/4=78.125 kHz. To support orthogonal frequency division multiple access (OFDMA) transmission, location relationships of different resource units (RUs) are shown in FIG. 1a, FIG. 1b, and FIG. 1c. FIG. 1a, FIG. 1b, and FIG. 1c show distribution of OFDMA RUs at system bandwidths of 20 MHz, 40 MHz, and 80 MHz, respectively. An arrow indicates a location of a leftover subcarrier (leftover tone) between RUs. A quantity of subcarriers corresponding to large-granularity RUs is equal to a sum of a quantity of subcarriers corresponding to a plurality of small-granularity RUs that can be included in the large-granularity RUs and a quantity of leftover subcarriers between small-granularity RUs.

In the 802.11ax system, an OFDMA multi-user data packet may include RUs of a plurality of granularities, and an AP allocates one RU to one user. RUs that can be allocated include:

(1) an RU including 26 contiguous subcarriers: 24 data subcarriers and 2 pilot subcarriers;

(2) an RU including 52 contiguous subcarriers: 48 data subcarriers and 4 pilot subcarriers;

(3) an RU including 106 contiguous subcarriers: 24 data subcarriers and 2 pilot subcarriers;

(4) an RU including 242 contiguous subcarriers: 234 data subcarriers and 8 pilot subcarriers;

(5) an RU including 484 contiguous subcarriers: 468 data subcarriers and 16 pilot subcarriers, where the RU is used in multi-user transmission at a system bandwidth of 40 MHz; and (6) an RU including 996 contiguous subcarriers: 980 data subcarriers and 16 pilot subcarriers, where the RU is used in multi-user transmission at a system bandwidth of 80 MHz or 160 MHz. A tone plan at a bandwidth of 160 MHz may be considered as a tone plan including two tone plans at a bandwidth of 80 MHz.

(2) Sending Mode in the 802.11ax System

In the 802.11ax system, HE-LTFs in two modes, namely, a 2× mode and a 4× mode, may be used for channel estimation. A subcarrier number (index) corresponding to an HE-LTF sequence in a 4× mode is the same as a tone plan of a data portion. For an HE-LTF sequence in a 2× mode, every other tone is selected from a tone plan of a data portion, that is, a corresponding subcarrier number thereof is a subcarrier number corresponding to the HE-LTF sequence in the 2× mode. Compared with the 2× mode, in the 4× mode, data sequences that are two times those in the 2× mode are inserted in a same tone plan. Therefore, more data can be transmitted in the 4× mode.

(3) PPDU Frame Format in the 802.11ax System

Figure 2A:
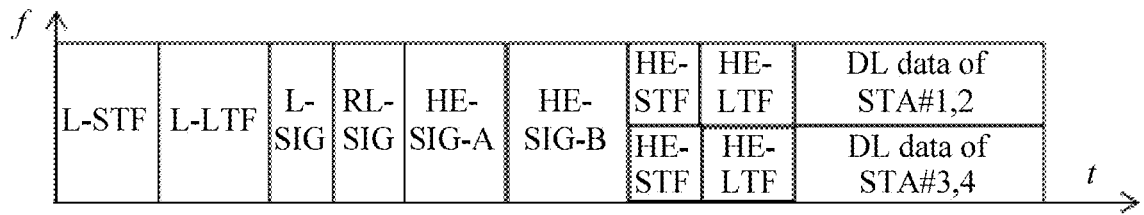
FIG. 2a is a schematic structural diagram of a downlink multi-user PPDU frame in an existing 802.11ax system.
Figure 2B:
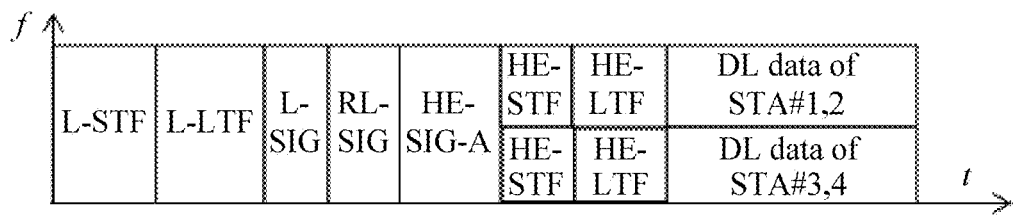
FIG. 2b is a schematic structural diagram of an uplink multi-user PPDU frame in an existing 802.11ax system.

A downlink multi-user presentation protocol data unit (PPDU) sent by the AP is shown in FIG. 2a. An uplink multi-user PPDU sent by a STA is shown in FIG. 2b. In the PPDU, an HE-SIG-A field is used to indicate a downlink STA transmission bandwidth, and an HE-SIG-B field is used to indicate a size and a location of an RU allocated by a STA that is scheduled in downlink, a STA ID corresponding to each scheduled STA, and other scheduling information such as a spatial flow number, and modulation and coding. Further, the HE-SIG-A field or the HE-SIG-B field may indicate that a plurality of STAs align an HE-LTF length, that is, indicate a symbol quantity N.

In specific implementation, two solutions may be used in the embodiments of the disclosure.

Solution 1: Masking-manner indication information used for second-time masking is pre-stored. When a terminal obtains a pilot sequence, first-time masking is performed on the pilot sequence based on a cyclic orthogonal matrix, and then second-time masking is performed, based on the pre-stored masking-manner indication information, on the pilot sequence on which first-time masking has been performed.

Solution 2: A pilot sequence on which two times of masking are performed is pre-stored. A terminal may obtain, based on information such as a size and a location of an allocated RU, the corresponding pilot sequence on which the two times of masking are performed. The two times of masking means that first-time masking is performed based on a cyclic orthogonal matrix and then second-time masking is performed, based on a pre-determined masking manner, on the pilot sequence on which first-time masking has been performed.

The following describes specific implementation processes of solution 1 and solution 2 in detail with reference to accompanying drawings.

Solution 1

In an embodiment of solution 1, masking-manner indication information used for second-time masking may be preset, where the masking-manner indication information may indicate a masking manner for the pilot sequence on which first-time masking has been performed. For example, the masking-manner indication information may indicate whether original polarity of each piece of data in the pilot sequence is to be kept or is to be reversed, where one piece of data in the pilot sequence is one element in the sequence, and one element is corresponding to one data subcarrier. The masking-manner indication information may also indicate whether original polarity of each subsequence in the pilot sequence is to be kept or is to be reversed, where one subsequence includes a plurality of elements, that is, one subsequence is corresponding to a plurality of subcarriers.

To simplify technology implementation, a block mask template may be preset, where the block mask template provides, in unit of a block, masking-manner indication information corresponding to each block, and one block is corresponding to one subsequence in the pilot sequence. During second-time masking performed, by using the mask template, on the pilot sequence on which first-time masking has been performed, masking may be performed on a corresponding subsequence based on a masking manner corresponding to each block, where masking manners of all elements in the subsequence are the same. Optionally, a block size is fixed, for example, one block is corresponding to one subsequence of a length L, that is, a block length is L. A value of L may be set based on a requirement. For example, the value of L may be 2, 4, 6, 8, or the like.

The preset block mask template may be obtained based on a method such as emulation. For example, if a block length is equal to L, all possible block mask templates are determined for a pilot sequence, so as to form a candidate block mask template set. First-time masking is performed on the pilot sequence based on the cyclic orthogonal matrix, and then second-time masking is performed, by using all block mask templates in the candidate block mask template set one by one, on the pilot sequence on which first-time masking has been performed, and PAPRs obtained by using different candidate block mask templates are measured. A candidate block mask template corresponding to a most reduced PAPR is obtained by comparing the PAPRs corresponding to the candidate block mask templates. The block mask template is stored in a STA to be used as a block mask template for second-time masking. During determining of a PAPR reduction degree, a PAPR measured after second-time masking is performed by using a candidate block mask template may be compared with a PAPR measured after first-time masking is performed.

Further, during selecting a block mask template for second-time masking in the foregoing manner, whether orthogonality is improved may also be considered. For example, the selected block mask template is a block mask template, among all candidate block mask templates, that can be used to obtain a most reduced PAPR and improve orthogonality. Certainly, during selection of the block mask template, both a PAPR and orthogonality may be balanced based on a requirement.

A value of a block length L of the block mask template may be set based on a requirement. When a larger value of L is used, a scale of a candidate block mask template set used in a process of selecting an appropriate block mask template through emulation is smaller, leading to lower calculation overheads and higher processing efficiency; and higher processing efficiency is achieved when second-time masking is performed, by using the selected block mask template, on the pilot sequence on which first-time masking has been performed. Compared with a case in which a relatively large value of L is used, when a relatively small value of L is used, it is more likely that a preferred block mask template can be selected. Therefore, in actual application, the value of L may be set based on a requirement, so as to achieve balance between the two cases.

Optionally, in some embodiments, corresponding block mask templates may be set based on RUs with different sizes and locations. Further, if the system supports pilot sequences in a 2× mode and in a 4× mode, block mask templates may be set for RUs with different sizes and locations in different modes.

The following shows a block mask template of a block length L=4:

MASK(−128:2:127) =

{+, +, +, +, +, −, −, +, −, +, −, −, +, −, −, +, +, +, +, +,

+, +, +, −, −, −, +, −, +, −, −, +}

MASK (−128:2:127) includes 32 pieces of block indication information, and each piece of block indication information is represented by "+" or "−". A length of each block is 4 (L=4), and masking may be performed on a subsequence of a length of 4 in a pilot sequence. In this way, masking may be performed on a pilot sequence of a length not greater than 32×4=128 by using the block mask template. (−128:2:127) indicates that numbers of subcarriers corresponding to the mask are from −128 to 127, and the mask (namely, the block mask template) is used in the 2× mode. Therefore, after a pilot sequence corresponding to subcarrier numbers −128 to 127 is obtained, a value is selected from values corresponding to every two subcarriers in the pilot sequence, so as to obtain the pilot sequence in the 2× mode. Each block in the mask is corresponding to a subsequence of a length of 4 in the pilot sequence in the 2× mode.

"+" indicates that original polarity of a subsequence of a length of 4 is kept unchanged when a block mask is used for processing; and "−" indicates that polarity of a subsequence of a length of 4 needs to be reversed when a block mask is used for processing. Masking may be performed on a pilot sequence of a length not greater than 128 by using the block mask template. Each subsequence of a length of 4 is corresponding to indication information of a masking manner corresponding to one block in the block mask template (that is, "+" or "−" in the foregoing mask).

With reference to accompanying drawings, the following describes in detail a pilot sequence sending process provided by the embodiment of solution 1.

Figure 3:
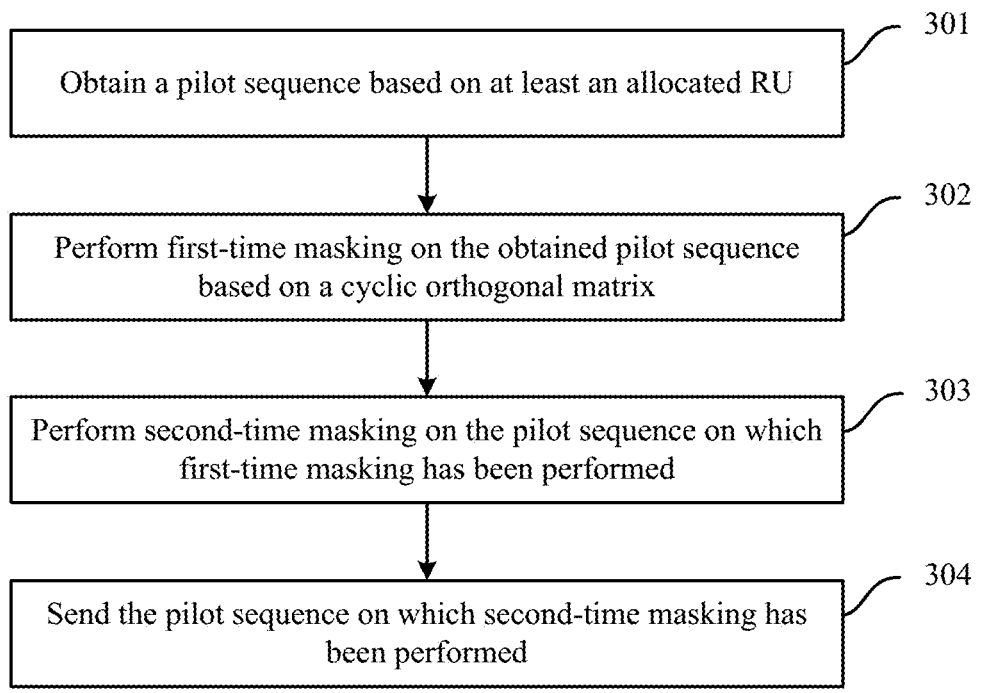
FIG. 3 is a schematic flowchart of sending a pilot sequence according to implementation solution 1 of the disclosure.

Referring to FIG. 3, FIG. 3 is a schematic diagram of a pilot sequence sending process according to an embodiment of the disclosure. The process may be executed by a terminal (for example, a STA), and more specifically, may be executed by a transmitter in the terminal. As shown in the figure, the process may include the following steps.

Step 301: Obtain a pilot sequence based on at least an allocated RU.

An 802.11ax system is used as an example. As shown in FIG. 1a, FIG. 1b, and FIG. 1c, different system bandwidths are corresponding to different HE-LTF sequences, and different uplink MIMO sending modes (such as a 2× mode and a 4× mode) are corresponding to different HE-LTF sequences at a same bandwidth. At a same system bandwidth and in a same uplink MIMO sending mode, different RU locations and sizes are corresponding to different HE-LTF sequences. Therefore, the STA may obtain a corresponding pilot sequence based on a system bandwidth, a size and a location of an RU allocated by an AP to the STA, an uplink MIMO sending mode, and the like. Certainly, if the system bandwidth is single or fixed, the system bandwidth may not be used as a basis to obtain the pilot sequence; if the uplink MIMO sending mode is single or fixed, the uplink MIMO sending mode may not be used as a basis to obtain the pilot sequence.

Step 302: Perform first-time masking on the obtained pilot sequence based on a cyclic orthogonal matrix.

In some embodiments, the cyclic orthogonal matrix used in this step may be a P-matrix. In consideration of a case in which the current system supports a maximum of eight-flow transmission, the P-matrix is usually an 8×8 matrix. The following provides a type of P-matrix:

$$P_{8\times 8} = \begin{bmatrix} 1 & -1 & 1 & 1 & 1 & -1 & 1 & 1 \\ 1 & 1 & -1 & 1 & 1 & 1 & -1 & 1 \\ 1 & 1 & 1 & -1 & 1 & 1 & 1 & -1 \\ -1 & 1 & 1 & 1 & -1 & 1 & 1 & 1 \\ 1 & -1 & 1 & 1 & -1 & 1 & -1 & -1 \\ 1 & 1 & -1 & 1 & -1 & -1 & 1 & -1 \\ 1 & 1 & 1 & -1 & -1 & -1 & -1 & 1 \\ -1 & 1 & 1 & 1 & 1 & -1 & -1 & -1 \end{bmatrix}$$

Eight rows of sequences in the P-matrix are corresponding to eight encoded sequence flows, respectively, and a corresponding row of the matrix is used for masking each HE-LTF sequence flow. Each row of sequence is shown as follows:

$P_1 = P_{8\times 8}[1,:]$;
$P_2 = P_{8\times 8}[2,:]$;
$P_3 = P_{8\times 8}[3,:]$;
$P_4 = P_{8\times 8}[4,:]$;
$P_5 = P_{8\times 8}[5,:]$;
$P_6 = P_{8\times 8}[6,:]$;
$P_7 = P_{8\times 8}[7,:]$;
$P_8 = P_{8\times 8}[8,:]$ P1, P2, P3, P4, P5, P6, P7, and P8 are corresponding to the first to the eighth rows in the P-matrix, respectively.

During first-time masking performed on the pilot sequence by using the P-matrix, the P-matrix is used for mask processing based on a block length of 8. The first row of sequence in the P-matrix is used for masking a first flow, the second row of sequence in the P-matrix is used for masking a second flow, and so on. That is, every eight pieces of data are used as one block, and masking is performed based on a row of sequence in the P-matrix, so as to ensure orthogonality. "1" indicates that original polarity is kept unchanged, and "−1" indicates that polarity is reversed. When a data length cannot be exactly divided by 8, remaining data is filled with 0 to ensure orthogonality.

In some other embodiments, the cyclic orthogonal matrix used in this step may alternatively be a Chu-matrix. In consideration of a case in which the current system supports a maximum of eight-flow transmission, the Chu-matrix is usually an 8×8 matrix. The following provides a type of Chu-matrix:

$$C_{8\times 8} = \begin{bmatrix} 1 & w & w^4 & w^9 & w^{16} & w^{25} & w^{36} & w^{49} \\ w & w^4 & w^9 & w^{16} & w^{25} & w^{36} & w^{49} & 1 \\ w^4 & w^9 & w^{16} & w^{25} & w^{36} & w^{49} & 1 & w \\ w^9 & w^{16} & w^{25} & w^{36} & w^{49} & 1 & w & w^4 \\ w^{16} & w^{25} & w^{36} & w^{49} & 1 & w & w^4 & w^9 \\ w^{25} & w^{36} & w^{49} & 1 & w & w^4 & w^9 & w^{16} \\ w^{36} & w^{49} & 1 & w & w^4 & w^9 & w^{16} & w^{25} \\ w^{49} & 1 & w & w^4 & w^9 & w^{16} & w^{25} & w^{36} \end{bmatrix},$$

where $w = \exp(j \cdot \frac{\pi}{8}) = 0.9239 + 0.3827j$.

It can be learned that each row of sequence in the Chu-matrix is obtained through cyclic shifting on a previous row of sequence. There is cyclic orthogonality between rows. PAPRs obtained after all rows are used for mask processing on the pilot sequence in a same manner are the same.

Certainly, the cyclic orthogonal matrix used in the embodiment of the disclosure is not limited to the P-matrix and Chu-matrix illustrated above. Cyclic orthogonal matrix in another form also falls within the protection scope of the disclosure, provided that orthogonality of a masked sequence can be ensured.

Step 303: Perform second-time masking on the pilot sequence on which first-time masking has been performed.

In this step, a preset block mask template may be used for second-time masking on the pilot sequence on which first-time masking has been performed. Specifically, the STA may obtain a corresponding block mask template based on a system bandwidth, a size and a location of an RU allocated by the AP to the STA, an uplink MIMO sending mode, and the like, and then the block mask template is used to perform second-time masking on the pilot sequence on which first-time masking has been performed. Certainly, if the system bandwidth is single or fixed, the system bandwidth may not be used as a basis to obtain the block mask template; if the uplink MIMO sending mode is single or fixed, the uplink MIMO sending mode may not be used as a basis to obtain the block mask template.

That the block mask template includes indication information of a masking manner corresponding to each of M blocks is used as an example. During second-time masking performed on the pilot sequence based on the block mask template, masking may be performed on a subsequence corresponding to each block in the pilot sequence on which first-time masking has been performed, to obtain the pilot sequence on which second-time masking has been performed. A masking manner corresponding to a block is keeping polarity unchanged or making polarity reversed. If one block is corresponding to one subsequence of a length N in the pilot sequence, M×N is greater than or equal to a length of the pilot sequence on which first-time masking has been performed, where both M and N are integers greater than 1.

The preset masking manner or block mask template is obtained by using a method such as emulation, so that a PAPR of the pilot sequence on which second-time masking has been performed is less than a PAPR of the pilot sequence on which first-time masking has been performed, and further, higher orthogonality can be obtained.

Step 304: Send the pilot sequence on which second-time masking has been performed.

In this step, 802.11ax is used as an example. The STA may add the pilot sequence on which second-time masking has been performed to an HE-LTF field corresponding to the STA in a PPDU. Then, signal modulation, resource mapping, and other processing may be performed according to the 802.11ax protocol, and the pilot sequence is sent by using an antenna.

When the foregoing embodiment is applied to an uplink MU-MIMO transmission process, in order that the AP can distinguish a plurality of STAs that use same time-frequency resources, before sending the pilot sequence on which second-time masking has been performed, the STA may multiply an identification code allocated by the AP to the STA by the pilot sequence on which second-time masking has been performed, where the identification code is used to identify a STA scheduled based on uplink MU-MIMO. Certainly, the operation of multiplying the identification code allocated by the AP to the STA may alternatively be performed after the pilot sequence is obtained in step 301, or performed after the pilot sequence on which first-time masking has been performed is obtained in step 302.

It can be learned from the foregoing description that in the foregoing embodiment of the disclosure, after first-time masking is performed on the pilot sequence based on the cyclic orthogonal matrix, second-time masking is performed on the pilot sequence on which first-time masking has been performed, so that a PAPR of the pilot sequence on which second-time masking has been performed is less than a PAPR of the pilot sequence on which first-time masking has been performed, and further, orthogonality of the pilot sequence on which second-time masking has been performed can be higher than that of the pilot sequence on which first-time masking has been performed.

To understand the embodiment of the disclosure more clearly, with reference to several specific application scenarios, the following provides further description by using an 802.11ax system as an example.

Scenario 1

A system bandwidth is 20 MHz, an uplink MI-MIMO sending mode is a 2× mode, and an RU allocated by the AP to the STA is an RU of a largest granularity (an RU corresponding to 242 contiguous subcarriers shown in FIG. 1a).

In this scenario, in step 301, the STA first obtains an HE-LTF sequence based on the RU corresponding to the 242 contiguous subcarriers, and then one element is obtained from every two elements in the HE-LTF sequence based on the uplink MI-MIMO sending mode (the 2× mode), to form the following HE-LTF sequence:

$HELTF_{2x}(-122:2:122) = [+1, -1, +1, -1, -1, -1, +1, -1, -1, -1, -1,$
$+1, +1, +1, -1, +1, +1, -1, -1, +1, -1, -1, -1, +1, +1, +1, +1,$
$-1, +1, -1, -1, +1, -1, +1, +1, +1, -1, +1, +1, +1, +1, -1, +1,$
$-1, -1, +1, -1, -1, -1, +1, +1, -1, -1, +1, -1, -1, -1, +1, +1,$
$+1, +1, 0, -1, +1, -1, -1, +1, +1, -1, +1, +1, +1, +1, -1, +1,$
$+1, +1, -1, +1, -1, -1, +1, -1, +1, +1, -1, -1, +1, +1, +1, -1,$
$+1, +1, -1, +1, -1, -1, +1, -1, +1, +1, -1, -1, +1, +1, -1, -1,$
$+1, +1, +1, -1, +1, +1, -1, +1, -1, -1, -1, +1, -1, -1, -1, -1]$

"2" in (−122:2:122) indicates that the uplink MI-MIMO sending mode is a 2× mode, so that the HE-LTF sequence in the 2× mode may be obtained in the following manner: One element is obtained from every two elements in the HE-LTF sequence corresponding to the 242 contiguous subcarriers, to obtain the HE-LTF sequence in the 2× mode.

If in step 302, first-time masking is performed on the obtained HE-LTF sequence by using the P-matrix, in step 303, second-time masking is performed by using the following block mask template of L=4:

$MASK(-128:2:127) =$
$\{+, +, +, +, +, -, -, +, -, +, -, -, +, -, -, +, +, +, +, +,$
$+, +, +, -, -, -, +, -, +, -, -, +\}$

"+" indicates that original polarity of a subsequence of a length of 4 is kept unchanged when second-time masking is performed on the sequence on which first-time masking has been performed by using the P-matrix; and "−" indicates that polarity of a subsequence of a length of 4 needs to be reversed when second-time masking is performed on the sequence on which first-time masking has been performed by using the P-matrix.

If in step 302, first-time masking is performed on the obtained HE-LTF sequence by using a cyclic orthogonal matrix, that is, a Chu-matrix, in step 303, second-time masking is performed by using the following block mask template of L=8:

$MASK(-128:2:127) = \{+, -, +, -, -, +, -, +, +, -, -, +, +, +, +, +\}$

"+" indicates that original polarity of a subsequence of a length of 8 is kept unchanged when second-time masking is performed on the sequence on which first-time masking has been performed by using the Chu matrix; and "−" indicates that polarity of a subsequence of a length of 8 needs to be reversed when second-time masking is performed on the sequence on which first-time masking has been performed by using the Chu-matrix.

Scenario 2

A system bandwidth is 40 MHz, an uplink MI-MIMO sending mode is a 2× mode, and an RU allocated by the AP to the STA is an RU of a largest granularity (an RU corresponding to 484 contiguous subcarriers shown in FIG. 1b).

In step 301, the STA first obtains an HE-LTF sequence based on the RU corresponding to the 484 contiguous subcarriers, and then one element is obtained from every two elements in the HE-LTF sequence based on the uplink MI-MIMO sending mode (the 2× mode), to form the following HE-LTF sequence:

$HELTF_{2x}(-244:2:244) = [+1, +1, +1, +1, -1, +1, +1, +1, -1, +1, -1,$
$-1, +1, -1, -1, -1, +1, +1, -1, -1, -1, +1, -1, -1, +1, -1, +1,$
$+1, -1, +1, -1, -1, -1, +1, -1, -1, -1, -1, +1, +1, +1, -1, +1,$
$+1, -1, -1, +1, -1, -1, -1, +1, +1, +1, +1, -1, -1, -1, -1, +1,$
$+1, +1, -1, +1, +1, -1, -1, +1, -1, -1, +1, +1, +1, +1, -1, +1,$
$+1, +1, +1, -1, -1, -1, +1, +1, -1, -1, +1, -1, -1, -1, +1,$
$+1, +1, +1, +1, -1, -1, +1, +1, -1, -1, +1, -1, -1, +1, -1,$

-continued

+1, −1, −1, −1, +1, −1, −1, −1, +1, −1, +1, +1, −1, +1, 0, 0,

0, +1, +1, +1, −1, −1, −1, −1, +1, −1, −1, −1, +1, −1, −1, −1,

−1, −1, +1, +1, +1, −1, +1, +1, −1, −1, +1, +1, −1+1, −1+1,

+1, −1, +1, +1, +1, −1, −1, +1, +1, −1, +1, −1, −1, +1, −1,

+1, +1, +1, −1, +1, +1, +1, +1, +1, +1, −1, −1, +1, +1, +1,

−1, +1, +1, −1, +1, −1, −1, +1, −1, +1, +1, −1, +1, +1, +1,

−1, −1, +1, +1, +1, −1, +1, +1, −1, +1, −1, −1, −1, +1, −1,

−1, −1, −1, +1, +1, +1, +1, −1, −1, −1, +1, −1, −1, +1, +1,

−1, +1, +1, +1, −1, −1, −1, −1, +1, −1, −1, −1, +1, −1, +1]

"2" in (−244:2:244) indicates that the uplink MI-MIMO sending mode is a 2× mode, so that the HE-LTF sequence in the 2× mode may be obtained in the following manner: One element is obtained from every two elements in the HE-LTF sequence corresponding to the 484 contiguous subcarriers, to obtain the HE-LTF sequence in the 2× mode.

If in step 302, first-time masking is performed on the obtained HE-LTF sequence by using the P-matrix, in step 303, second-time masking is performed by using the following block mask template of L=4:

MASK(−256:2:255) = {0, −, −, +, −, −, +, −, −, −, −, −, −, +, +, +, +, −,

+, −, +, +, −, −, +, −, +, +, +, +, −, −, −, −,

−, −, +, −, +, −, −, −, −, +, −, +, −, +, −, +,

+, −, −, −, −, −, +, −, +, +, +, −, −, +, +, 0}

"+" indicates that original polarity of a subsequence of a length of 4 is kept unchanged when second-time masking is performed on the sequence on which first-time masking has been performed by using the P-matrix; "−" indicates that polarity of a subsequence of a length of 4 needs to be reversed when second-time masking is performed on the sequence on which first-time masking has been performed by using the P-matrix; and "0" indicates a zero sequence of a length of 4. When a zero sequence of a length of 4 is used to perform second-time masking on a corresponding subsequence in the HE-LTF sequence, original polarity of the subsequence may be kept unchanged, or polarity of the subsequence may be reversed. Specific processing may be performed according to an agreement reached in advance. This is because for uplink MU-MIMO transmission, if original polarity of HE-LTF sequences in these locations is kept unchanged or polarity of HE-LTF sequences in these locations is reversed, neither a subsequent signal processing process is affected, nor HE-LTF sequence based channel estimation and frequency offset detection are affected.

If in step 302, first-time masking is performed on the obtained HE-LTF sequence by using the cyclic orthogonal matrix, that is, the Chu-matrix, in step 303, second-time masking is performed by using the following block mask template of L=8:

MASK(−256:2:255) =

{−, −, +, −, −, −, −, +, −, −, +, −, +, +, +, −, −, −, −, +,

+, +, +, −, +, +, +, +, +, +, −, −}

"+" indicates that original polarity of a subsequence of a length of 8 is kept unchanged when second-time masking is performed on the sequence on which first-time masking has been performed by using the Chu matrix; and "−" indicates that polarity of a subsequence of a length of 8 needs to be reversed when second-time masking is performed on the sequence on which first-time masking has been performed by using the Chu-matrix.

Scenario 3

A system bandwidth is 80 MHz, an uplink MI-MIMO sending mode is a 2× mode, and an RU allocated by the AP to the STA is an RU of a largest granularity (an RU corresponding to 996 contiguous subcarriers shown in FIG. 1c).

In this scenario, in step 301, the STA first obtains an HE-LTF sequence based on the RU corresponding to the 996 contiguous subcarriers, and then one element is obtained from every two elements in the HE-LTF sequence based on the uplink MI-MIMO sending mode (the 2× mode), to form the following HE-LTF sequence:

$HELTF_{2x}(-500:2:500)$ = [+1, +1, −1, +1, +1, +1, −1, +1, +1, +1, +1,

−1, −1, −1, +1, −1, −1, +1, +1, −1, +1, +1, +1, −1, −1, −1, −1,

+1, +1, +1, +1, −1, +1, +1, +1, −1, +1, −1, −1, +1, −1, −1, −1,

+1, +1, −1, −1, −1, +1, −1, −1, +1, −1, +1, +1, −1, +1, +1, −1,

+1, −1, −1, −1, +1, −1, −1, −1, −1, +1, −1, −1, +1, +1, −1, +1,

+1, +1, −1, −1, −1, +1, −1, +1, +1, +1, −1, +1, +1, +1, +1,

−1, −1, −1, +1, +1, +1, −1, −1, +1, +1, +1, −1, +1, +1, −1, +1,

−1, −1, −1, +1, −1, −1, −1, +1, −1, +1, +1, −1, +1, +1, −1,

−1, −1, +1, −1, −1, −1, +1, −1, +1, +1, −1, +1, +1, −1, −1,

+1, +1, +1, −1, +1, +1, −1, +1, −1, −1, +1, −1, +1, +1, +1, −1,

+1, +1, +1, +1, −1, −1, −1, +1, −1, −1, +1, −1, +1, +1, +1,

−1, −1, −1, −1, +1, +1, +1, −1, −1, −1, −1, +1, −1, −1, −1,

+1, −1, +1, +1, +1, −1, −1, +1, +1, +1, −1, +1, +1, −1, +1,

−1, −1, −1, −1, +1, −1, −1, −1, +1, −1, +1, −1, +1, +1, −1,

+1, +1, −1, −1, +1, −1, −1, −1, +1, +1, +1, +1, −1, +1, −1,

−1, −1, +1, −1, −1, −1, −1, +1, +1, +1, +1, −1, −1, −1, +1,

+1, +1, 0, 0, 0, +1, −1, −1, +1, +1, −1, +1, −1, −1, −1, +1, +1,

+1, +1, −1, +1, +1, +1, −1, +1, −1, −1, −1, −1, +1, +1, +1,

−1, +1, +1, −1, −1, +1, −1, −1, −1, −1, +1, −1, +1, +1,

+1, −1, +1, +1, +1, +1, −1, +1, −1, −1, +1, −1, −1, −1, +1, +1,

−1, −1, −1, +1, −1, +1, +1, −1, +1, +1, +1, +1, −1, −1,

−1, +1, +1, +1, +1, −1, −1, −1, +1, −1, −1, +1, +1, −1, +1, +1,

+1, −1, −1, −1, −1, +1, −1, −1, −1, +1, +1, +1, −1, +1, −1,

−1, +1, −1, −1, −1, +1, +1, −1, −1, −1, +1, −1, −1, +1, −1, +1,

+1, +1, −1, +1, +1, +1, −1, +1, −1, +1, +1, +1, −1, −1, −1,

+1, −1, −1, −1, −1, +1, −1, +1, +1, −1, +1, +1, +1, −1, +1,

+1, +1, −1, −1, −1, +1, +1, +1, +1, −1, +1, +1, +1, −1, +1, −1,

−1, −1, −1, +1, +1, +1, −1, +1, +1, −1, −1, +1, −1, −1, −1,

+1, −1, −1, −1, +1, −1, +1, +1, −1, +1, +1, −1, +1, −1, −1, +1,

−1, −1, −1, +1, +1, −1, −1, −1, +1, −1, +1, −1, +1, +1, +1,

-continued

−1, +1, +1, +1, +1, −1, −1, −1, −1, +1, +1, +1, −1, +1, +1, −1,

−1, +1, −1, −1, −1, +1, +1, +1, +1, −1, +1, +1, +1, −1, +1, +1]

"2" in (−500:2:500) indicates that the uplink MI-MIMO sending mode is a 2× mode, so that the HE-LTF sequence in the 2× mode may be obtained in the following manner: One element is obtained from every two elements in the HE-LTF sequence corresponding to the 996 contiguous subcarriers, to obtain the HE-LTF sequence in the 2× mode.

If in step 302, first-time masking is performed on the obtained HE-LTF sequence by using the P-matrix, in step 303, second-time masking is performed by using the following block mask template of L=4:

MASK(−512:2:511) =

{0, −, −, −, −, +, +, +, −, +, +, +, +, −, +, +,
+, −, −, +, +, +, +, −, +, −, +, −, −, +, +, −,
+, +, −, +, +, +, +, −, +, +, +, −, +, +, +, −,
−, −, +, −, −, +, +, −, −, +, −, −, −, −, +, +,
+, +, +, −, −, +, +, −, +, −, +, −, −, −, −, +,
+, −, −, −, −, −, −, −, −, +, −, −, −, +, +, +,
+, −, −, +, +, +, +, −, +, −, −, +, −, +, −, −,
−, −, −, −, +, −, +, −, +, −, −, +, −, −, +, 0}

"+" indicates that original polarity of a subsequence of a length of 4 is kept unchanged when second-time masking is performed on the sequence on which first-time masking has been performed by using the P-matrix; "−" indicates that polarity of a subsequence of a length of 4 needs to be reversed when second-time masking is performed on the sequence on which first-time masking has been performed by using the P-matrix; and "0" indicates a zero sequence of a length of 4. When a zero sequence is used to perform second-time masking on a corresponding subsequence in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the cyclic orthogonal matrix, that is, the Chu-matrix, in step 303, second-time masking is performed by using the following block mask template of L=8:

MASK(−512:2:511) =

{−, +, +, +, −, +, −, −, −, +, −, +, +, −, +, −,
+, −, +, +, +, +, +, +, +, +, +, +, −, +, +, +,
+, +, +, −, +, +, +, +, +, +, +, +, +, −, +,
+, +, −, +, +, +, +, −, −, +, −, +, +, +, +}

"+" indicates that original polarity of a subsequence of a length L is kept unchanged when second-time masking is performed on the sequence on which first-time masking has been performed by using the Chu matrix; and "−" indicates that polarity of a subsequence of a length L needs to be reversed when second-time masking is performed on the sequence on which first-time masking has been performed by using the Chu-matrix.

In the foregoing scenario 1 to scenario 3, a processing process in which first-time masking is performed on an HE-LTF sequence in a 2× mode by using the P-matrix or the Chu-matrix and then second-time masking is performed on the HE-LTF sequence by using different block lengths is provided. The block masking manner provided by the foregoing processing process is merely an example. In the embodiment of the disclosure, another block masking manner may alternatively be used for second-time masking.

FIG. 4 shows PAPR values obtained at bandwidths of 20 MHz, 40 MHz, and 80 MHz in a 2× mode after masking is performed on an HE-LTF sequence based on a P-matrix and then block masking is performed on the HE-LTF sequence by using a block length L=4. In the figure, the first column represents different bandwidths in the 2× mode; the second column represents quantities of RUs at different bandwidths in the 2× mode; the third column represents minimum PAPR values (target values) of data portions; the fourth column represents PAPR values of the HE-LTF sequence on which no mask processing is performed; the fifth column represents PAPR values of the HE-LTF sequence on which two times of masking (first-time masking is performed by using the P-matrix and then block masking is performed) are performed; the sixth column represents PAPR values of the HE-LTF sequence on which masking is performed merely based on the P sequence; values in brackets of the fourth, fifth, and sixth columns all are data obtained based on comparison with the target values in the third column. It can be learned from this group of PAPR values that a PAPR value increases when masking is performed by merely using the P-matrix, and a PAPR value decreases when masking is performed on the HE-LTF sequence by using the P-matrix and then block masking processing is performed on the HE-LTF sequence.

FIG. 5 shows PAPR values obtained at bandwidths of 20 MHz, 40 MHz, and 80 MHz in a 2× mode after masking is performed on an HE-LTF sequence based on a Chu-matrix and then block masking is performed on the HE-LTF sequence by using a block length L=8. In the figure, the first column represents different bandwidths in the 2× mode; the second column represents quantities of RUs at different bandwidths in the 2× mode; the third column represents minimum PAPR values (target values) of data portions; the fourth column represents PAPR values of the HE-LTF sequence on which no mask processing is performed; the fifth column represents PAPR values of the HE-LTF sequence on which two times of masking (first-time masking is performed by using the Chu-matrix and then block masking is performed) are performed; the sixth column represents PAPR values of the HE-LTF sequence on which masking is performed merely based on the Chu-matrix; values in brackets of the fourth, fifth, and sixth columns all are data obtained based on comparison with the target values in the third column. It can be learned from this group of PAPR values that a PAPR value increases when masking is performed by merely using the Chu_matrix, and a PAPR value decreases when masking is performed on the HE-LTF sequence by using the Chu_matrix and then block masking processing is performed on the HE-LTF sequence.

Scenario 4

A system bandwidth is 20 MHz, an uplink MI-MIMO sending mode is a 4× mode, and an RU allocated by the AP to the STA is an RU of a largest granularity (an RU corresponding to 242 contiguous subcarriers shown in FIG. 1a).

In this scenario, in step 301, the STA obtains the following HE-LTF sequence based on the RU allocated by the AP to the STA:

$HELTF_{4x}(-122:122) = [+1, -1, +1, -1, +1, -1, +1, +1, +1, -1, +1,$ $+1, +1, -1, -1, +1, -1, -1, -1, -1, -1, +1, +1, -1, -1, -1, -1,$ $-1, +1, -1, +1, -1, -1, +1, +1, -1, +1, +1, +1, -1, -1, +1, -1,$ $-1, -1, -1, +1, +1, +1, -1, -1, -1, -1, +1, +1, -1, +1, -1, -1,$ $+1, +1, -1, +1, -1, +1, +1, +1, -1, -1, +1, -1, -1, -1, +1, -1,$ $-1, -1, -1, -1, -1, -1, +1, -1, +1, +1, -1, +1, +1, -1, +1, -1,$ $-1, -1, +1, +1, -1, +1, +1, +1, -1, -1, +1, +1, +1, +1, +1, +1,$ $-1, +1, -1, +1, +1, +1, +1, -1, -1, -1, +1, +1, +1, -1, 0, 0,$ $0, +1, -1, +1, +1, +1, +1, +1, +1, -1, +1, -1, -1, +1, +1, -1,$ $-1, +1, -1, +1, -1, +1, +1, +1, -1, +1, +1, +1, -1, -1, +1, -1,$ $-1, -1, -1, -1, +1, +1, -1, -1, -1, +1, -1, +1, -1, +1,$ $+1, -1, -1, +1, -1, -1, -1, +1, +1, -1, +1, +1, +1, +1, -1,$ $-1, -1, +1, +1, +1, +1, +1, +1, -1, +1, -1, -1, +1, +1, -1,$ $+1, -1, +1, +1, +1, -1, -1, +1, -1, -1, -1, +1, -1, -1, -1,$ $-1, -1, -1, +1, -1, +1, -1, -1, +1, -1, -1, +1, -1, +1, +1,$ $+1, -1, -1, +1, -1, -1, -1, +1, +1, -1, -1, -1, -1, -1, +1]$

If in step 302, first-time masking is performed on the obtained HE-LTF sequence by using the P-matrix, in step 303, second-time masking is performed by using the following block mask template of L=6:

MASK(−128:127) =

{+, −, +, −, +, +, +, −, −, −, −, +, −, −, +, +,
−, +, +, +, −, +, +, +, −, +, +, −, −, −, +, +}

"+" indicates that original polarity of a subsequence of a length of 6 is kept unchanged when second-time masking is performed on the sequence on which first-time masking has been performed by using the P-matrix; and "−" indicates that polarity of a subsequence of a length of 6 needs to be reversed when second-time masking is performed on the sequence on which first-time masking has been performed by using the P-matrix. When the block mask template is used for second-time masking on the HE-LTF sequence on which first-time masking has been performed, it is equivalent to that polarity of the HE-LTF sequence is reversed by 0 degree or 180 degrees for 32 times.

If in step 302, first-time masking is performed on the obtained HE-LTF sequence by using the P-matrix, in step 303, second-time masking is performed by using the following block mask template of L=6:

MASK(−128:127) = {×1, +, +, +, −, +, +, −, −, +, +, −, +, −, −,
−, +, −, −, +, −, +, −, −, −, −, +, −, −,
+, +, −, +, +, −, +, −, +, −, +, −, +, ×2}

"+" indicates that original polarity of a subsequence of a length of 6 is kept unchanged when second-time masking is performed on the sequence on which first-time masking has been performed by using the Chu matrix; and "−" indicates that polarity of a subsequence of a length of 6 needs to be reversed when second-time masking is performed on the sequence on which first-time masking has been performed by using the Chu-matrix. "x1" represents a zero sequence of a length of 6; "x2" represents a zero sequence of a length of 4. When x1 and x2 are used to perform second-time masking on corresponding subsequences in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the Chu-matrix, in step 303, second-time masking is performed by using the following block mask template of L=8:

MASK(−128:127) =

{+, −, +, +, −, +, +, −, −, +, +, +, −, −, −, −,
−, −, +, −, +, −, +, −, −, +, +, −, +, −, +, +}

"+" indicates that original polarity of a subsequence of a length of 8 is kept unchanged when second-time masking is performed on the sequence on which first-time masking has been performed by using the Chu matrix; and "−" indicates that polarity of a subsequence of a length of 8 needs to be reversed when second-time masking is performed on the sequence on which first-time masking has been performed by using the Chu-matrix.

Scenario 5

A system bandwidth is 40 MHz, an uplink MI-MIMO sending mode is a 4× mode, and an RU allocated by the AP to the STA is an RU of a largest granularity (an RU corresponding to 484 contiguous subcarriers shown in FIG. 1b).

In this scenario, in step 301, the STA obtains the following HE-LTF sequence based on the RU allocated by the AP to the STA:

$HELTF_{4x}(-244:244) = [+1, +1, -1, +1, -1, +1, -1, -1, -1, +1, -1,$ $-1, -1, +1, +1, -1, +1, +1, +1, +1, +1, -1, -1, +1, +1, +1, +1,$ $-1, +1, -1, +1, -1, -1, +1, +1, -1, +1, +1, +1, -1, -1, +1, -1,$ $-1, -1, -1, +1, +1, +1, -1, -1, -1, -1, -1, +1, +1, +1, +1,$ $+1, +1, -1, +1, +1, +1, -1, +1, +1, -1, -1, -1, +1, -1, +1, -1,$ $-1, +1, +1, -1, +1, -1, +1, +1, +1, +1, -1, -1, +1, +1, +1,$ $-1, +1, +1, -1, -1, -1, +1, -1, +1, +1, -1, +1, +1, -1, +1, -1,$ $-1, +1, +1, +1, +1, -1, -1, +1, +1, +1, +1, -1, +1, +1, -1,$

-continued
-1, -1, +1, -1, -1, -1, +1, -1, +1, -1, +1, +1, -1, +1, -1, +1,
-1, +1, +1, +1, -1, +1, +1, +1, -1, -1, +1, -1, -1, -1, -1,
-1, +1, +1, -1, -1, -1, -1, +1, -1, +1, -1, +1, +1, -1, -1,
+1, -1, -1, -1, +1, +1, -1, +1, +1, +1, +1, -1, -1, -1, +1,
+1, +1, +1, +1, +1, +1, +1, +1, +1, +1, -1, +1, +1, +1,
-1, +1, +1, -1, -1, -1, +1, -1, +1, -1, -1, +1, +1, -1, +1,
-1, +1, +1, +1, +1, +1, -1, -1, +1, +1, -1, +1, +1, -1,
-1, -1, +1, -1, +1, +1, -1, +1, +1, -1, +1, -1, -1, 0, 0, 0, 0,
0, +1, +1, -1, +1, -1, -1, +1, -1, -1, +1, -1, +1, +1, +1, -1,
-1, +1, -1, -1, -1, +1, +1, -1, -1, -1, -1, -1, +1, -1, +1, -1,
-1, +1, +1, -1, +1, -1, +1, +1, +1, -1, -1, +1, -1, -1, -1, +1,
-1, -1, -1, -1, -1, -1, -1, +1, -1, -1, -1, -1, +1, +1, +1,
-1, -1, -1, -1, +1, -1, -1, +1, +1, +1, -1, +1, +1, -1, -1, "+" indicates that original polarity of a subsequence of a length of 8 is kept unchanged when second-time masking is performed on the sequence on which first-time masking has been performed by using the P-matrix; and "−" indicates that polarity of a subsequence of a length of 8 needs to be reversed when second-time masking is performed on the sequence on which first-time masking has been performed by using the P-matrix. "0" represents a zero sequence of a length of 8. When the zero sequence is used to perform second-time masking on a corresponding subsequence in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the P-matrix, in step 303, second-time masking is performed by using the following block mask template of L=6:

MASK(−256:255) =

{×1, −, +, −, −, −, +, −, +, −, −, −, −, −, −, +, +, +,
−, −, +, −, +, −, −, +, −, −, +, +, +, −, +, +, −,
−, −, −, +, +, +, +, −, −, +, −, −, +, −, −, +, −,
−, +, −, −, −, −, −, +, +, +, −, +, −, +, +, +, −,
−, −, −, +, +, −, +, +, −, +, +, −, +, −, ×2}

-continued
+1, −1, +1, −1, +1, +1, +1, +1, −1, −1, +1, +1, +1, +1, +1,
−1, +1, +1, −1, −1, −1, +1, −1, −1, −1, +1, −1, +1, −1, +1,
+1, −1, −1, −1, −1, +1, +1, −1, −1, −1, −1, +1, −1, −1, +1,
+1, +1, −1, +1, −1, −1, +1, −1, −1, +1, −1, +1, −1, −1, +1,
−1, +1, +1, −1, +1, +1, −1, +1, −1, −1, −1, +1, +1, −1, +1,
+1, +1, −1, −1, +1, +1, +1, +1, +1, −1, −1, +1, +1, +1, −1,
−1, +1, −1, +1, −1, −1, −1, +1, −1, −1, +1, +1, +1, −1, +1,
+1, +1, +1, +1, +1, +1, +1, −1, −1, −1, −1, +1, +1, +1, −1,
−1, −1, −1, +1, −1, −1, +1, +1, +1, −1, +1, +1, −1, −1, +1,
−1, +1, −1, +1, +1, +1, +1, −1, −1, +1, +1, +1, +1, +1, −1,
+1, +1, −1, −1, −1, +1, −1, −1, −1, +1, −1, +1, −1, +1, +1]

"+" indicates that original polarity of a subsequence of a length of 6 is kept unchanged when second-time masking is performed on the sequence on which first-time masking has been performed by using the P-matrix; and "−" indicates that polarity of a subsequence of a length of 6 needs to be reversed when second-time masking is performed on the sequence on which first-time masking has been performed by using the P-matrix. "x1" represents a zero sequence of a length of 12; "x2" represents a zero sequence of a length of 8. When x1 and x2 are used to perform second-time masking on corresponding subsequences in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the P-matrix, in step 303, second-time masking is performed by using the following block mask template of L=8:

MASK(−256:255) =

{0, −, −, +, −, +, +, −, −, +, +, +, +, +, +, −,
+, −, +, +, −, +, −, −, −, +, −, −, −, +, +, +,
+, −, +, +, −, +, −, −, −, +, +, −, +, −, −, +,
−, −, +, +, −, +, −, +, −, −, +, −, +, +, +, 0}

If in step 302, first-time masking is performed on the obtained HE-LTF sequence by using the Chu-matrix, in step 303, second-time masking is performed by using the following block mask template of L=8:

MASK(−256:255) =

{0, −, −, −, +, +, −, +, +, −, −, +, −, −, +, +,
−, −, −, −, +, +, +, −, −, +, −, +, −, +, −, −,
+, +, +, +, −, −, −, −, −, +, +, −, −, +, −, −,
−, −, +, −, +, −, −, −, −, +, +, −, −, −, +, 0}

"+" indicates that original polarity of a subsequence of a length L is kept unchanged when second-time masking is performed on the sequence on which first-time masking has been performed by using the Chu matrix; and "−" indicates that polarity of a subsequence of a length L needs to be reversed when second-time masking is performed on the sequence on which first-time masking has been performed by using the Chu-matrix. "0" represents a zero sequence of a length of 8. When the zero sequence is used to perform second-time masking on a corresponding subsequence in the HE-LTF sequence, original polarity of the subsequence may be kept unchanged, or polarity of the subsequence may be reversed. Specific processing may be performed according to an agreement reached in advance.

Scenario 6

A system bandwidth is 80 MHz, an uplink MI-MIMO sending mode is a 4× mode, and an RU allocated by the AP to the STA is an RU of a largest granularity (an RU corresponding to 996 contiguous subcarriers shown in FIG. 1c).

In this scenario, in step 301, the STA obtains the following HE-LTF sequence based on the RU allocated by the AP to the STA:

$HELTF_{4x}(-500:500) = [+1, +1, -1, +1, -1, +1, -1, -1, -1, +1, -1,$ $-1, -1, +1, +1, -1, +1, +1, +1, +1, +1, -1, -1, +1, +1, +1, +1,$ $-1, +1, -1, +1, -1, -1, +1, +1, -1, +1, +1, +1, -1, -1, +1, -1,$ $-1, -1, -1, +1, +1, +1, -1, -1, -1, -1, -1, -1, +1, +1, +1, +1,$ $+1, +1, -1, +1, +1, +1, -1, +1, +1, -1, -1, -1, +1, -1, +1, -1,$ $-1, +1, +1, -1, -1, +1, +1, +1, +1, +1, -1, -1, +1, +1, +1, +1,$ $-1, +1, +1, -1, -1, -1, +1, -1, +1, +1, -1, +1, +1, -1, +1, -1,$ $-1, +1, +1, +1, +1, -1, -1, +1, +1, +1, +1, +1, -1, +1, +1, -1,$ $-1, -1, +1, -1, -1, -1, +1, -1, +1, -1, +1, +1, -1, +1, -1, +1,$ $-1, +1, +1, +1, -1, +1, +1, +1, -1, -1, +1, -1, -1, -1, -1, -1,$ $+1, +1, -1, -1, -1, -1, +1, -1, +1, -1, +1, +1, -1, -1, +1, -1,$ $-1, -1, +1, +1, -1, +1, +1, +1, +1, -1, -1, -1, +1, +1, +1,$ $+1, -1, +1, +1, +1, +1, +1, +1, +1, -1, +1, +1, -1, -1, +1, +1,$ $-1, -1, -1, +1, -1, +1, -1, -1, +1, +1, -1, +1, -1, +1, +1,$ $+1, +1, +1, -1, -1, +1, +1, +1, -1, +1, +1, -1, -1, -1, +1,$ $-1, +1, +1, -1, +1, +1, -1, +1, -1, -1, +1, -1, +1, -1, +1, -1,$ $+1, +1, +1, -1, +1, +1, +1, -1, -1, +1, -1, -1, -1, -1, -1,$ $+1, +1, -1, -1, -1, -1, +1, -1, +1, -1, +1, +1, -1, -1, +1,$ $-1, -1, -1, +1, +1, -1, +1, +1, +1, -1, -1, -1, +1, +1, +1,$ $+1, -1, +1, -1, -1, -1, -1, -1, +1, -1, -1, -1, +1, -1,$ $-1, +1, +1, +1, -1, +1, -1, +1, +1, -1, -1, +1, -1, +1, -1,$ $-1, -1, -1, -1, +1, +1, -1, -1, -1, +1, -1, -1, +1, +1, +1, -1,$ $+1, -1, -1, +1, -1, -1, -1, +1, +1, +1, +1, +1, +1, -1, -1,$ $+1, +1, +1, +1, +1, -1, +1, +1, -1, -1, -1, +1, -1, -1, -1, +1,$ $-1, +1, -1, +1, +1, -1, +1, -1, +1, -1, +1, +1, -1, +1, +1,$ $+1, -1, -1, +1, -1, -1, -1, -1, +1, +1, -1, -1, -1, -1, +1,$ $+1, -1, +1, +1, -1, +1, +1, +1, +1, +1, -1, -1, +1, +1, -1, -1,$ $+1, +1, -1, -1, -1, +1, -1, +1, +1, -1, +1, +1, -1, +1, -1,$ $-1, -1, +1, -1, +1, -1, -1, -1, -1, +1, +1, +1, -1, -1, +1, 0,$ $0, 0, 0, 0, +1, -1, -1, -1, -1, -1, -1, +1, -1, +1, +1, -1, -1,$ $+1, +1, -1, +1, -1, +1, +1, -1, -1, +1, -1, +1, -1, -1, -1, +1,$ $+1, -1, +1, +1, +1, -1, +1, +1, +1, +1, +1, +1, +1, -1, +1, -1,$ $-1, +1, -1, -1, +1, -1, +1, +1, +1, -1, -1, +1, -1, -1, -1, +1,$ $+1, -1, -1, -1, -1, -1, +1, -1, -1, -1, -1, -1, +1, +1, -1, -1,$ $-1, -1, -1, +1, -1, -1, +1, +1, +1, -1, +1, +1, +1, -1, +1, -1,$ $+1, -1, -1, -1, -1, +1, +1, +1, -1, -1, -1, -1, +1, -1, -1,$ $+1, +1, +1, -1, +1, +1, -1, -1, +1, -1, +1, -1, -1, -1, -1, -1,$ $-1, -1, +1, +1, -1, -1, -1, +1, -1, -1, +1, +1, +1, -1, +1, -1,$ $-1, +1, -1, -1, +1, -1, +1, +1, +1, -1, -1, -1, +1, +1, -1,$ $+1, -1, +1, +1, +1, -1, -1, +1, -1, -1, -1, +1, -1, -1, -1, -1,$ $-1, -1, -1, +1, -1, +1, +1, -1, +1, +1, -1, +1, -1, -1, -1, +1,$ $+1, -1, +1, +1, -1, -1, +1, +1, +1, +1, -1, +1, -1, +1, -1,$ $-1, -1, +1, +1, -1, -1, -1, -1, -1, +1, -1, -1, +1, +1, +1, -1,$ $+1, +1, +1, -1, +1, -1, +1, -1, -1, -1, -1, +1, +1, +1, -1,$ $-1, -1, -1, +1, -1, -1, +1, +1, +1, -1, +1, +1, -1, -1, -1, +1,$ $+1, -1, +1, +1, -1, -1, +1, +1, +1, +1, -1, +1, -1, +1, -1,$ $-1, -1, +1, +1, -1, -1, -1, -1, +1, -1, -1, +1, +1, +1, -1,$ $+1, +1, +1, -1, +1, -1, +1, -1, -1, -1, -1, +1, +1, +1, -1,$ $-1, -1, -1, +1, -1, -1, +1, +1, +1, -1, +1, +1, -1, -1, +1, +1,$ $+1, -1, -1, +1, -1, -1, +1, -1, -1, -1, -1, -1, -1, +1,$ $-1, +1, -1, +1, +1, -1, +1, -1, -1, -1, +1, +1, -1, +1, +1,$ $+1, -1, -1, +1, +1, +1, +1, -1, +1, +1, +1, +1, -1, -1, -1,$ $-1, +1, -1, +1, +1, +1, +1, -1, -1, -1, +1, +1, +1, +1,$ $-1, +1, +1, -1, -1, -1, +1, -1, -1, +1, +1, -1, +1, -1, +1,$ $-1, -1, -1, -1, -1, +1, -1, -1, -1, +1, -1, -1, +1,$ $+1, +1, -1, +1, -1, -1, +1, -1, -1, +1, -1, +1, -1, +1, -1,$ $+1, -1, -1, +1, +1, -1, -1, +1, +1, +1, -1, -1, +1, -1,$ $-1, -1, +1, -1, -1, -1, -1, -1, -1, +1, -1, +1, -1,$ $+1, +1, -1, +1, -1, -1, -1, +1, -1, +1, +1, +1, -1, -1,$ $+1, +1, +1, +1, +1, -1, -1, -1, -1, -1, +1, +1, -1, -1,$ $-1, -1, -1, +1, -1, -1, +1, +1, -1, +1, +1, +1, -1, +1,$ $-1, +1, -1, -1, -1, -1, +1, +1, -1, -1, -1, -1, +1,$ $-1, -1, +1, +1, +1, -1, +1, +1, -1, -1, +1, -1, +1, -1, +1]$

If in step 302, first-time masking is performed on the obtained HE-LTF sequence by using the P-matrix, in step 303, second-time masking is performed by using the following block mask template of L=8:

MASK(−512:511) =

{0, −, −, +, −, +, +, −, −, +, +, +, +, +, +, +,
+, −, +, −, −, +, +, +, +, −, +, −, −, −, −, +,
−, +, −, −, −, −, −, +, +, −, +, −, +, −, −, −,
+, −, −, +, −, −, −, +, −, +, −, +, −, +, +, +,
+, +, +, +, −, +, −, +, −, −, −, +, −, +, −, −,
+, +, +, −, +, +, −, +, +, +, −, +, −, −, −, +,
+, +, −, +, −, −, +, −, +, +, +, +, −, −, +, −,
+, +, −, −, +, +, −, +, +, −, −, +, −, −, +, 0}

"+" indicates that original polarity of a subsequence of a length of 8 is kept unchanged when second-time masking is performed on the sequence on which first-time masking has been performed by using the P-matrix; and "−" indicates that polarity of a subsequence of a length of 8 needs to be reversed when second-time masking is performed on the sequence on which first-time masking has been performed by using the P-matrix. "0" represents a zero sequence of a length of 8. When the zero sequence is used to perform second-time masking on a corresponding subsequence in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the P-matrix, in step 303, second-time masking is performed by using the following block mask template of L=6:

MASK(−512:511) =
{×1, −, −, +, −, −, −, −, +, −, +, +, +, −, −, +, −, −, −, +,
−, +, +, −, +, −, +, +, −, −, +, −, +, +, −, −, +, +, +,
+, +, −, −, +, −, −, +, −, −, +, −, +, −, +, +, −, +, +,
−, +, +, −, +, −, −, −, +, −, +, +, −, +, +, +, −, +, −,
−, −, +, +, +, +, +, +, +, +, +, +, −, +, −, +, +, +, +,
+, +, −, +, +, +, −, +, +, −, −, +, +, +, −, −, +, −,
+, +, −, +, −, +, +, −, +, −, −, +, +, +, +, −, +, +,
−, −, +, −, +, +, −, +, −, +, −, −, +, +, +, −, +, +, +,
+, +, −, +, −, −, +, +, −, +, −, −, +, −, +, ×2}

"+" indicates that original polarity of a subsequence of a length of 6 is kept unchanged when second-time masking is performed on the sequence on which first-time masking has been performed by using the P-matrix; and "−" indicates that polarity of a subsequence of a length of 6 needs to be reversed when second-time masking is performed on the sequence on which first-time masking has been performed by using the P-matrix. "x1" represents a zero sequence of a length of 12; "x2" represents a zero sequence of a length of 10. When x1 and x2 are used to perform second-time masking on corresponding subsequences in the HE-LTF sequence, original polarity of the subsequence may be kept unchanged, or polarity of the subsequence may be reversed. Specific processing may be performed according to an agreement reached in advance.

If in step 302, first-time masking is performed on the obtained HE-LTF sequence by using the Chu-matrix, in step 303, second-time masking is performed by using the following block mask template of L=8:

MASK(−512:511) =

{0, −, +, +, +, −, +, −, −, −, +, −, −, −, −, −,
−, +, −, −, −, −, −, +, +, +, −, +, −, +, +, +,
+, −, −, −, +, +, +, −, +, +, −, −, +, −, −, −,
−, −, −, −, −, +, +, −, +, −, +, −, −, −, +, +,
+, +, +, −, +, +, +, −, −, +, +, −, +, −, −, +,
−, −, −, +, +, +, +, +, +, −, +, +, +, +, +, −,
+, −, −, +, +, +, −, +, −, +, +, +, +, +, +, −,
−, +, +, −, +, −, −, +, −, +, +, −, −, −, +, 0}

"+" indicates that original polarity of a subsequence of a length of 8 is kept unchanged when second-time masking is performed on the sequence on which first-time masking has been performed by using the Chu matrix; and "−" indicates that polarity of a subsequence of a length of 8 needs to be reversed when second-time masking is performed on the sequence on which first-time masking has been performed by using the Chu-matrix. "0" represents a zero sequence of a length of 8. When the zero sequence is used to perform second-time masking on a corresponding subsequence in the HE-LTF sequence, original polarity of the subsequence may be kept unchanged, or polarity of the subsequence may be reversed. Specific processing may be performed according to an agreement reached in advance.

In the foregoing scenario 4 to scenario 6, a processing process in which first-time masking is performed on an HE-LTF sequence in a 4× mode by using the P-matrix or the Chu-matrix and then second-time masking is performed on the HE-LTF sequence by using different block lengths is provided. The block masking manner provided by the foregoing processing process is merely an example. In the embodiment of the disclosure, another block masking manner may alternatively be used for second-time masking.

FIG. 6 shows PAPR values obtained at bandwidths of 20 MHz, 40 MHz, and 80 MHz in a 4× mode after masking is performed on an HE-LTF sequence based on a P-matrix and then block masking is performed on the HE-LTF sequence by using a block length L=8. In the figure, the first column represents different bandwidths in the 4× mode; the second column represents quantities of RUs at different bandwidths in the 4× mode; the third column represents minimum PAPR values (target values) of data portions; the fourth column represents PAPR values of the HE-LTF sequence on which no mask processing is performed; the fifth column represents PAPR values of the HE-LTF sequence on which two times of masking (first-time masking is performed by using the P-matrix and then block masking is performed) are performed; the sixth column represents PAPR values of the HE-LTF sequence on which masking is performed merely based on the P sequence; values in brackets of the fourth, fifth, and sixth columns all are data obtained based on comparison with the target values in the third column. It can be learned from this group of PAPR values that a PAPR value increases when masking is performed by merely using the P-matrix, and a PAPR value decreases when masking is performed on the HE-LTF sequence by using the P-matrix and then block masking processing is performed on the HE-LTF sequence.

FIG. 7 shows PAPR values obtained at bandwidths of 20 MHz, 40 MHz, and 80 MHz in a 4× mode after masking is performed on an HE-LTF sequence based on a P-matrix and then block masking is performed on the HE-LTF sequence by using a block length L=6. In the figure, the first column represents different bandwidths in the 4× mode; the second column represents quantities of RUs at different bandwidths in the 4× mode; the third column represents minimum PAPR values (target values) of data portions; the fourth column represents PAPR values of the HE-LTF sequence on which no mask processing is performed; the fifth column represents PAPR values of the HE-LTF sequence on which two times of masking (first-time masking is performed by using the P-matrix and then block masking is performed) are performed; the sixth column represents PAPR values of the HE-LTF sequence on which masking is performed merely based on the P-matrix; values in brackets of the fourth, fifth, and sixth columns all are data obtained based on comparison with the target values in the third column. It can be learned from this group of PAPR values that a PAPR value increases when masking is performed by merely using the P-matrix, and a PAPR value decreases when masking is performed on the HE-LTF sequence by using the P-matrix and then block masking processing is performed on the HE-LTF sequence.

Figures 8, 9:
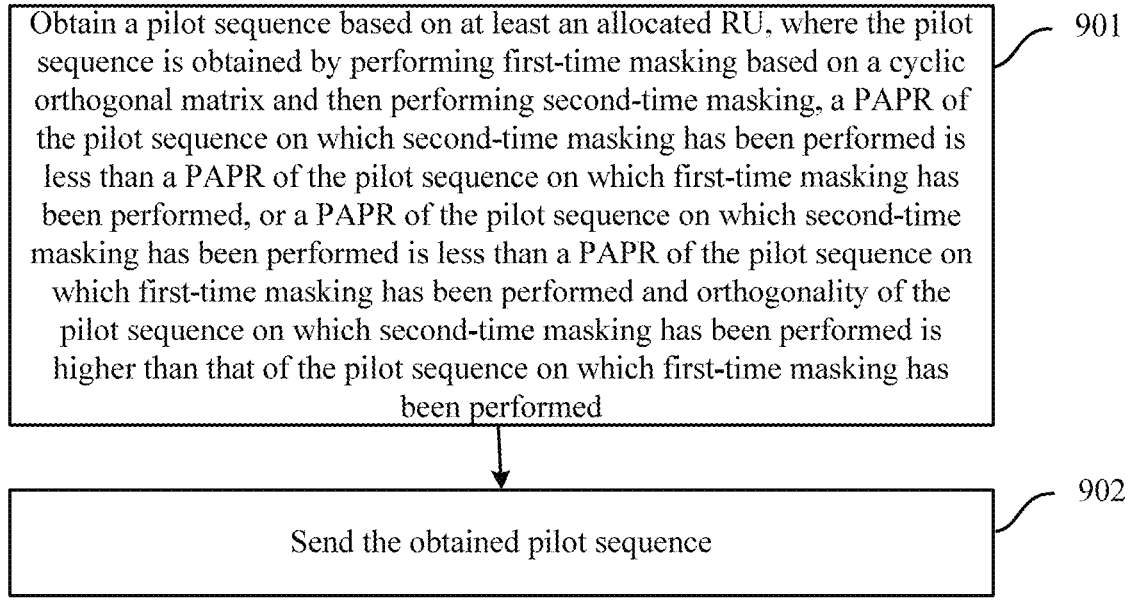
FIG. 8 shows a table of comparison between a PAPR value of a 4×HE-LTF sequence on which first-time masking has been performed based on a Chu-matrix and a PAPR value of the 4×HE-LTF sequence on which second-time masking has been performed based on a block length L=8 according to an embodiment of the disclosure.
FIG. 9 is a schematic flowchart of sending a pilot sequence according to embodiment solution 2 of the disclosure.

FIG. 8 shows PAPR values obtained at bandwidths of 20 MHz, 40 MHz, and 80 MHz in a 4× mode after masking is performed on an HE-LTF sequence based on a Chu-matrix and then block masking is performed on the HE-LTF sequence by using a block length L=8. In the figure, the first column represents different bandwidths in the 4× mode; the second column represents quantities of RUs at different bandwidths in the 4× mode; the third column represents minimum PAPR values (target values) of data portions; the fourth column represents PAPR values of the HE-LTF sequence on which no mask processing is performed; the fifth column represents PAPR values of the HE-LTF sequence on which masking is performed by using the Chu-matrix and then block masking is performed; the sixth column represents PAPR values of the HE-LTF sequence on which masking is performed merely based on the Chu matrix; values in brackets of the fourth, fifth, and sixth columns all are data obtained based on comparison with the target values in the third column. It can be learned from this group of PAPR values that a PAPR value increases when masking is performed by merely using the Chu matrix, and a PAPR value decreases when masking is performed on the HE-LTF sequence by using the Chu matrix and then block masking processing is performed on the HE-LTF sequence.

Solution 2

In solution 2, two times of masking may be pre-performed on a pilot sequence (that is, first-time masking is performed on the pilot sequence based on a cyclic orthogonal matrix and then second-time masking is performed on the pilot sequence on which first-time masking has been performed), and then the pilot sequence on which the two times of masking are performed is stored. A STA only needs to obtain the pre-stored pilot sequence based on information such as an RU allocated to the STA, and sends the obtained pilot sequence. The pilot sequence obtained by the STA is a pilot sequence on which the two times of masking are performed, so that a PAPR of the pilot sequence is less than a PAPR of the pilot sequence on which first-time masking has been performed, and further, higher orthogonality can be obtained.

In specific implementation, two times of masking are performed on a pilot sequence corresponding to each RU, and the pilot sequence on which masking is performed is stored.

A specific implementation method for performing the two times of masking on the pilot sequence is the same as the method for performing two times of masking described in solution 1. Details are not repeated herein.

Referring to FIG. 9, FIG. 9 is a schematic diagram of a pilot sequence sending process according to an embodiment of the disclosure. The process may include the following steps.

Step 901: Obtain a pilot sequence based on at least an allocated RU, where the pilot sequence is obtained by performing first-time masking based on a cyclic orthogonal matrix and then performing second-time masking, a PAPR of the pilot sequence on which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed.

Step 902: Send the obtained pilot sequence.

In this step, 802.11ax is used as an example. A STA may add the obtained pilot sequence to an HE-LTF field corresponding to the STA in a PPDU. Then, signal modulation, resource mapping, and other processing may be performed according to the 802.11ax protocol, and the pilot sequence is sent by using an antenna.

When the foregoing embodiment is applied to an uplink MU-MIMO transmission process, in order that an AP can distinguish a plurality of STAs that use same time-frequency resources, after obtaining the pilot sequence, the STA may multiply an identification code allocated by the AP to the STA by the pilot sequence, where the identification code is used to identify a STA scheduled based on uplink MU-MIMO.

It can be learned from the foregoing description that in the foregoing embodiment of the disclosure, after first-time masking is performed on the pilot sequence based on the cyclic orthogonal matrix, second-time masking is performed on the pilot sequence on which first-time masking has been performed, so that a PAPR of the pilot sequence on which second-time masking has been performed is less than a PAPR of the pilot sequence on which first-time masking has been performed, and further, orthogonality of the pilot sequence on which second-time masking has been performed can be higher than that of the pilot sequence on which first-time masking has been performed.

Based on the same technical concept, an embodiment of the disclosure further provides a resource indication processing apparatus, for example, an access point device (such as a STA). The apparatus may implement the pilot sequence sending process provided by the foregoing embodiments.

Correspondingly, another implementation provides a resource indication processing apparatus (not shown), where the apparatus is applied to a wireless local area network using an OFDMA technology, includes a processing unit, and is configured to execute the method in the foregoing implementation. For a specific structure and content of a frame, refer to the foregoing implementations, and details are not described herein again. The processing unit may be a general purpose processor, a digital signal processor, an application-specific integrated circuit, a field programmable gate array or another programmable logic device, a discrete gate or a transistor logic device, or a discrete hardware assembly, and may implement or execute the methods, steps, and logical block diagrams disclosed in the embodiments of the present disclosure. The general purpose processor may be a microprocessor, any conventional processor, or the like. The steps of the methods disclosed with reference to the embodiments of the present disclosure may be directly implemented by a hardware processor, or may be implemented by using a combination of hardware and software modules in the processor. It is easy to understand that the foregoing resource indication processing apparatus may be located at an access point or a station.

Figure 10:
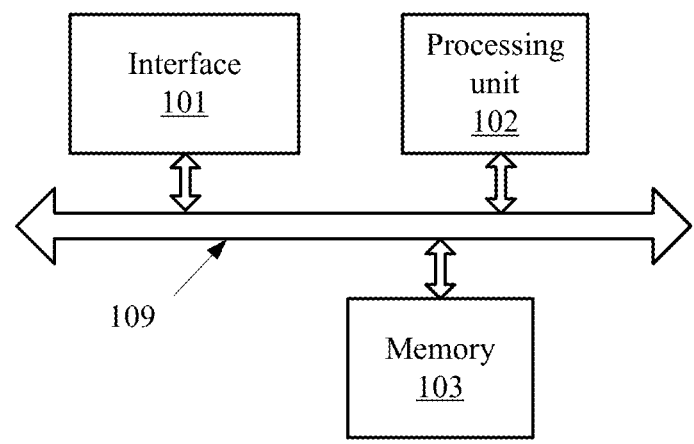
FIG. 10 is a schematic structural diagram of an access point according to an embodiment of the disclosure.

FIG. 10 is a block diagram of an access point according to another embodiment of the present disclosure. The access point may implement the pilot sequence sending process provided by solution 1. The access point in FIG. 10 includes an interface 101, a processing unit 102, and a memory 103. The processing unit 102 controls an operation of the access point. The memory 103 may include a read-only memory and a random access memory, and provide an instruction and data to the processing unit 102. A part of the memory 103 may further include a non-volatile random access memory (NVRAM). Components of the access point are coupled together by using a bus system 109. In addition to a data bus, the bus system 109 includes a power bus, a control bus, and a status signal bus. However, for clear description, various buses in the figure are denoted as the bus system 109.

The frame sending methods disclosed in the foregoing embodiments of the present disclosure may be applied to the processing unit 102 or implemented by the processing unit 102. In an implementation process, steps in the foregoing methods may be implemented by using an integrated logic circuit of hardware in the processing unit 102, or by using an instruction in a form of software. The processing unit 102 may be a general purpose processor, a digital signal processor, an application-specific integrated circuit, a field programmable gate array or another programmable logic device, a discrete gate or a transistor logic device, or a discrete hardware assembly, and may implement or execute the methods, steps, of the present disclosure. The general purpose processor may be a microprocessor, any conventional processor, or the like. The steps of the methods disclosed with reference to the embodiments of the present disclosure may be directly implemented by a hardware processor, or may be implemented by using a combination of hardware and software modules in the processor. The software module may be located in a random access memory, a flash memory, a read-only memory, a programmable read-only memory or an electrically erasable programmable memory, a register, or another mature storage medium in the art. The storage medium is located in the memory 103. The processing unit 102 reads information in the memory 103 and completes the steps of the foregoing methods in combination with hardware in the processing unit 102.

Figure 11:
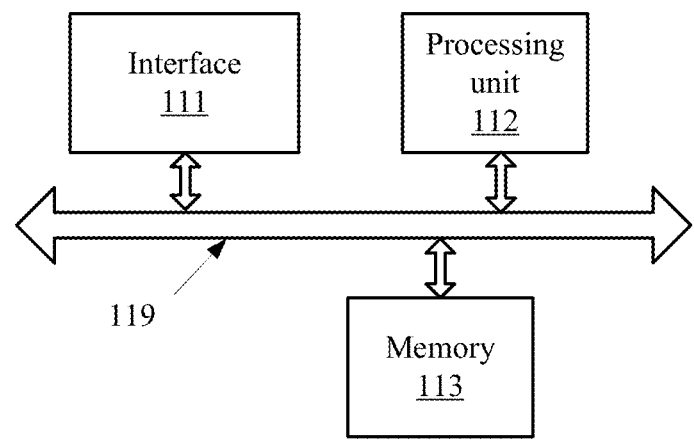
FIG. 11 is another schematic structural diagram of an access point according to an embodiment of the disclosure.

FIG. 11 is a block diagram of a station according to another embodiment of the present disclosure. The station may implement the pilot sequence sending process provided by solution 2. The station in FIG. 11 includes an interface 111, a processing unit 112, and a memory 113. The processing unit 112 controls an operation of the station. The memory 113 may include a read-only memory and a random access memory, and provide an instruction and data to the processing unit 112. A part of the memory 113 may further include a non-volatile random access memory (NVRAM). Components of the station are coupled together by using a bus system 119. In addition to a data bus, the bus system 119 includes a power bus, a control bus, and a status signal bus. However, for clear description, various buses in the figure are denoted as the bus system 119.

The frame receiving methods disclosed in the foregoing embodiments of the present disclosure may be applied to the processing unit 112 or implemented by the processing unit 112. In an implementation process, steps in the foregoing methods may be implemented by using an integrated logic circuit of hardware in the processing unit 112, or by using an instruction in a form of software. The processing unit 112 may be a general purpose processor, a digital signal processor, an application-specific integrated circuit, a field programmable gate array or another programmable logic device, a discrete gate or a transistor logic device, or a discrete hardware assembly, and may implement or execute the methods, steps, and logical block diagrams disclosed in the embodiments of the present disclosure. The general purpose processor may be a microprocessor, any conventional processor, or the like. The steps of the methods disclosed with reference to the embodiments of the present disclosure may be directly implemented by a hardware processor, or may be implemented by using a combination of hardware and software modules in the processor. The software module may be located in a random access memory, a flash memory, a read-only memory, a programmable read-only memory or an electrically erasable programmable memory, a register, or another mature storage medium in the art. The storage medium is located in the memory 113. The processing unit 112 reads information in the memory 113 and completes the steps of the foregoing methods in combination with hardware in the processing unit 112.

Specifically, the memory 113 stores the instruction that enables the processing unit 112 to perform the following operations: determining resource status information, where the resource status information indicates a busy/idle state of a sub-resource of a channel resource for data transmission between an access point and the station; and sending the resource status information to the access point, so that the access point allocates resources based on the resource status information.

A person skilled in the art should understand that the embodiments of the disclosure may be provided as a method, a system, or a computer program product. Therefore, the disclosure may use a form of hardware only embodiments, software only embodiments, or embodiments with a combination of software and hardware. Moreover, the disclosure may use a form of a computer program product that is implemented on one or more computer-usable storage media (including but not limited to a disk memory, a CD-ROM, an optical memory, and the like) that include computer usable program code.

The disclosure is described with reference to the flowcharts and/or block diagrams of the method, the device (system), and the computer program product according to the disclosure. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

What is claimed is:

1. A pilot sequence sending method, comprising:
   obtaining a pilot sequence based on at least an allocated resource unit (RU);
   performing first-time masking on the pilot sequence based on a cyclic orthogonal matrix;
   performing second-time masking on the pilot sequence on which first-time masking has been performed, wherein a peak-to-average power ratio (PAPR) of the pilot sequence on. which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed, wherein the performing second-time masking on the pilot sequence on which first-time masking has been performed comprises: performing, based on a masking manner corresponding to each of a first number (M) of blocks, masking on a subsequence corresponding to each block in the pilot sequence on which first-time masking has been performed, to obtain the pilot sequence on which second-time masking has been performed, wherein the first number (M) is an integer greater than 1; and
   sending the pilot sequence on which second-time masking has been performed.

2. The method according to claim 1, wherein one block corresponds to one subsequence of a length (N) in the pilot sequence, M×N is greater than or equal to a length of the pilot sequence on which first-time masking has been performed, and the length (N) is an integer greater than 1.

3. The method according to claim 2, before the performing, based on a masking manner corresponding to each of the first number (M) of blocks, masking on a subsequence corresponding to each block in the pilot sequence on which first-time masking has been performed, further comprising:
   obtaining a preset block mask template based on at least the allocated RU, wherein the block mask template comprises indication information of the masking manner corresponding to each of the first number (M) of blocks.

4. The method according to claim 3, wherein the obtaining a preset block mask template based on at least the allocated RU comprises:
   obtaining the preset block mask template based on a size and a location of the allocated RU; or
   obtaining the preset block mask template based on a size and a location of the allocated RU and an uplink multi-user multiple-input multiple-output (MU-MIMO) sending mode; or
   obtaining the preset block mask template based on a system bandwidth, a size and a location of the allocated RU, and an uplink MU-MIMO sending mode.

5. The method according to claim 2, wherein a masking manner corresponding to a block is keeping polarity unchanged or making polarity reversed.

6. The method according to claim 2, wherein the obtaining a pilot sequence comprises:
   obtaining the pilot sequence based on the size and the location of the allocated RU; or
   obtaining the pilot sequence based on the size and the location of the allocated resource unit RU and the uplink MU-MIMO sending mode; or
   obtaining the pilot sequence based on the system bandwidth, the size and the location of the allocated RU, and the uplink MU-MIMO sending mode.

7. The method according to claim 1, before the sending the pilot sequence on which second-time masking has been performed, further comprising:
   multiplying an allocated identification code by the pilot sequence on which second-time masking has been performed, wherein the identification code is used to identify a terminal scheduled based on uplink MU-MIMO.

8. An apparatus, comprising a memory and a processing unit, wherein
   the memory is configured to provide an instruction and data to the processing unit; and
   the processing unit is configured to perform operations based on the instruction and the data provided by the memory, the operations comprising:
   obtaining a pilot sequence based on at least an allocated resource unit (RU);
   performing first-time masking on the pilot sequence based on a cyclic orthogonal matrix;
   performing second-time masking on the pilot sequence on which first-time masking has been performed, wherein a peak-to-average power ratio (PAPR) of the pilot sequence on. which second-time masking has been performed is less than a PAPR of the pilot sequence on which first-time masking has been performed, or a PAPR of the pilot sequence on which second-time masking has been performed is less than a PAPR of the pilot sequence on which first-time masking has been performed and orthogonality of the pilot sequence on which second-time masking has been performed is higher than that of the pilot sequence on which first-time masking has been performed, wherein the performing second-time masking on the pilot sequence on which first-time masking has been performed comprises: performing, based on a masking manner corresponding to each of a first number (M) of blocks, masking on a subsequence corresponding to each block in the pilot sequence on which first-time masking has been performed, to obtain the pilot sequence on which second-time masking has been performed, wherein the first number (M) is an integer greater than 1: and
sending the pilot sequence on which second-time masking has been performed.

9. The apparatus according to claim 8, wherein one block corresponds to one subsequence of a length (N) in the pilot sequence, M×N is greater than or equal to a length of the pilot sequence on which first-time masking has been performed, and the length (N) is an integer greater than 1.

10. The apparatus according to claim 9, before the performing, based on a masking manner corresponding to each of the first number (M) of blocks, masking on a subsequence corresponding to each block in the pilot sequence on which first-time masking has been performed, further comprising:
obtaining a preset block mask template based on at least the allocated RU, wherein the block mask template comprises indication information of the masking manner corresponding to each of the first number (M) of blocks.

11. The apparatus according to claim 10, wherein the obtaining a preset block mask template based on at least the allocated RU comprises:
obtaining the preset block mask template based on a size and a location of the allocated RU; or
obtaining the preset block mask template based on a size and a location of the allocated RU and an uplink multi-user multiple-input multiple-output MU-MIMO sending mode; or
obtaining the preset block mask template based on a system bandwidth, a size and a location of the allocated RU, and an uplink MU-MIMO sending mode.

12. The apparatus according to claim 9, wherein a masking manner corresponding to a block is keeping polarity unchanged or making polarity reversed.

13. The apparatus according to claim 9, wherein the obtaining a pilot sequence comprises:
obtaining the pilot sequence based on the size and the location of the allocated RU; or
obtaining the pilot sequence based on the size and the location of the allocated resource unit RU and the uplink MU-MIMO sending mode; or
obtaining the pilot sequence based on the system bandwidth, the size and the location of the allocated RU, and the uplink MU-MIMO sending mode.

14. The apparatus according to claim 8, before the sending the pilot sequence on which second-time masking has been performed, further comprising:
multiplying an allocated identification code by the pilot sequence on which second-time masking has been performed, wherein the identification code is used to identify a terminal scheduled based on uplink MU-MIMO.

15. A non-transitory computer-readable medium comprising code which, when executed by a processor, causes the processor to perform operations, the operations comprising:
obtaining a pilot sequence based on at least an allocated resource unit (RU);
performing first-time masking on the pilot sequence based on a cyclic orthogonal matrix;
performing second-time masking on the pilot sequence on which first-time masking has been performed, wherein a peak-to-average power ratio (PAPR) of the pilot sequence on which second-time masking has been performed is less than a PAPR, of the pilot sequence on which first-time masking has been performed, or a PAPR of the pilot sequence on which second-time masking ha.s been performed is less than. a PAPR of the pilot sequence on which first-time masking has been performed and orthogonality of the pilot sequence on which second-time masking has been performed is higher than that of the pilot sequence on which first-time masking has been performed, wherein the performing second-time masking on the pilot sequence on which first-time masking has been performed comprises: performing, based on a masking manner corresponding to each of a first number (M) of blocks, masking on a subsequence corresponding to each block in the pilot sequence on which first-time masking has been performed, to obtain the pilot sequence on which second-time masking has been performed, wherein the first number (M) is an integer greater than 1; and
sending the pilot sequence on which second-time masking has been performed.

16. The non-transitory computer-readable medium according, to claim 15, wherein one block corresponds to one subsequence of a length (N) in the pilot sequence, M×N is greater than or equal to a length of the pilot sequence on which first-time masking has been performed, and the length (N) is an integer greater than 1.

17. The non-transitory computer-readable medium according to claim 16, before the performing, based on a masking manner corresponding to each of the first number (M) of blocks, masking on a subsequence corresponding to each block in the pilot sequence on which first-time masking has been performed, further comprising:
obtaining a preset block mask template based on at least the allocated RU, wherein the block mask template comprises indication information of the masking manner corresponding to each of the first number (M) of blocks.

18. The non-transitory computer-readable medium according to claim 17, wherein the obtaining a preset block mask template based on at least the allocated RU comprises:
obtaining the preset block mask template based on a size and a location of the allocated RU; or
obtaining the preset block mask template based on a size and a location of the allocated RU and an uplink multi-user multiple-input multiple-output MU-MIMO sending mode; or
obtaining the preset block mask template based on a system bandwidth, a size and a location of the allocated RU, and an unlink MU-MIMO sending mode.

19. The non-transitory computer-readable medium according to claim 16, wherein a masking manner corresponding to a block is keeping polarity unchanged or making polarity reversed.

20. The non-transitory computer-readable medium according to claim 16, wherein the obtaining a pilot sequence comprises:
obtaining the pilot sequence based on the size and the location of the allocated RU; or
obtaining the pilot sequence based on the size and the location of the allocated resource unit RU and the uplink MU-MIMO sending mode; or
obtaining the pilot sequence based on the system bandwidth, the size and the location of the allocated RU, and the unlink MU-MIMO sending mode.

* * * * *

UNITED STATES PATENT AND TRADEMARK OFFICE
CERTIFICATE OF CORRECTION

PATENT NO. : 10,756,865 B2  
APPLICATION NO. : 16/115296  
DATED : August 25, 2020  
INVENTOR(S) : Xue et al.

Page 1 of 1

It is certified that error appears in the above-identified patent and that said Letters Patent is hereby corrected as shown below:

On the Title Page

Item (30), In the Foreign Application Priority Data, delete "2016 1 00116067" and insert --2016 10 116067--.

In the Claims

In Claim 1, Column 31, Line 39, delete "on." and insert --on--.

In Claim 8, Column 33, Line 6, delete "than 1:" and insert --than 1;--.

In Claim 15, Column 34, Line 2, delete "PAPR," and insert --PAPR--.

In Claim 15, Column 34, Line 5, delete "ha.s" and insert --has--.

In Claim 15, Column 34, Line 5, delete "less than. a PAPR" and insert --less than a PAPR--.

In Claim 16, Column 34, Line 23, delete "according, to" and insert --according to--.

In Claim 18, Column 34, Line 50, delete "unlink" and insert --uplink--.

In Claim 20, Column 20, Line 65, delete "unlink" and insert --uplink--.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*